United States Patent
Umezawa et al.

(10) Patent No.: US 9,041,944 B2
(45) Date of Patent: May 26, 2015

(54) IMAGE PROCESSING APPARATUS, IMAGE PROCESSING METHOD, AND COMPUTER-READABLE MEDIUM FOR ARRANGING STATUS DISPLAY TO INCLUDE STATUS ICON AND STATUS DESCRIPTION

(71) Applicants: Asaki Umezawa, Tokyo (JP); Mikane Tago, Kanagawa (JP); Hiroshi Yamaguchi, Kanagawa (JP)

(72) Inventors: Asaki Umezawa, Tokyo (JP); Mikane Tago, Kanagawa (JP); Hiroshi Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 281 days.

(21) Appl. No.: 13/654,665

(22) Filed: Oct. 18, 2012

(65) Prior Publication Data
US 2013/0113823 A1  May 9, 2013

(30) Foreign Application Priority Data
Nov. 8, 2011 (JP) .................................. 2011-244717

(51) Int. Cl.
G09G 5/00 (2006.01)
H04N 1/00 (2006.01)

(52) U.S. Cl.
CPC .... *H04N 1/00464* (2013.01); *H04N 2201/3273* (2013.01); *H04N 1/00411* (2013.01); *H04N 1/00424* (2013.01); *H04N 1/00432* (2013.01); *H04N 1/00477* (2013.01); *H04N 1/00482* (2013.01); *H04N 2201/0094* (2013.01); *H04N 2201/3274* (2013.01); *H04N 2201/3202* (2013.01)

(58) Field of Classification Search
USPC ........................................ 358/1.13; 345/619
See application file for complete search history.

(56) References Cited

U.S. PATENT DOCUMENTS

| | | |
|---|---|---|
| 2007/0147870 A1 | 6/2007 | Shindo et al. |
| 2009/0046057 A1 | 2/2009 | Umezawa |
| 2009/0237699 A1 | 9/2009 | Umezawa |
| 2010/0037224 A1 | 2/2010 | Hosoda |
| 2011/0002000 A1* | 1/2011 | Tomaru ........................ 358/1.14 |
| 2012/0069382 A1* | 3/2012 | Osada .......................... 358/1.14 |

FOREIGN PATENT DOCUMENTS

| | | |
|---|---|---|
| JP | 2007-176048 | 7/2007 |
| JP | 2010-039761 | 2/2010 |

* cited by examiner

*Primary Examiner* — Qian Yang
(74) *Attorney, Agent, or Firm* — Harness, Dickey & Pierce, P.L.C.

(57) ABSTRACT

An image processing apparatus includes a system managing unit configured to manage an apparatus status of apparatus hardware; an acquiring unit configured to acquire application status information of an application from the application and apparatus status information from the system managing unit; an input unit configured to accept a display request for displaying a status monitor screen indicating an overall system status; a screen generating unit configured to receive the display request and generate the status monitor screen based on the application status information and the apparatus status information acquired by the acquiring unit, the status monitor screen including an application status display and an apparatus status display; and a display unit configured to display the status monitor screen generated by the screen generating unit.

13 Claims, 28 Drawing Sheets

FIG.3

|  | STATUS ID |
|---|---|
| APPARATUS | 1001 |
| COPY | 2001 |
| SCANNER | 3003 |
| FAX | 4011 |
| PRINTER | 5001 |
| DOCUMENT BOX | 6005 |

FIG.4

| STATUS ID | ICON ID | DESCRIPTION ID |
|---|---|---|
| 1001 | 1 | 001 |
| 1002 | 1 | 002 |
| ⋮ | ⋮ | ⋮ |
| 2001 | – | 010 |
| ⋮ | ⋮ | ⋮ |
| 3003 | – | 021 |
| ⋮ | ⋮ | ⋮ |
| 4011 | – | 101 |
| ⋮ | ⋮ | ⋮ |
| 5001 | 3 | 005 |
| ⋮ | ⋮ | ⋮ |
| 6005 | – | 019 |
| ⋮ | ⋮ | ⋮ |

FIG.5
| ICON ID | ICON IMAGE DATA |
|---------|-----------------|
| 1 |  |
| 2 |  |
| 3 |  |

FIG.6

| DESCRIPTION ID | DESCRIPTION |
|---|---|
| 001 | COVER IS OPEN |
| 002 | TONER EMPTY |
| 003 | TONER EMPTY CANNOT COPY |
| 004 | TONER EMPTY CANNOT PRINT |
| 005 | ERROR |
| ⋮ | ⋮ |
| 010 | READY TO COPY |
| ⋮ | ⋮ |
| 020 | TONER EMPTY BUT CAN SEND |
| 021 | READY TO SCAN |
| ⋮ | ⋮ |
| 101 | READY TO FAX |
| ⋮ | ⋮ |
| 110 | TONER EMPTY BUT CAN FAX |
| ⋮ | ⋮ |

FIG.7

| | ICON ID | DESCRIPTION ID | SELECT BUTTON BRIGHTNESS |
|---|---|---|---|
| APPARATUS | 1 | 001 | – |
| COPY | – | 010 | HALF-BRIGHT |
| SCANNER | – | 021 | HALF-BRIGHT |
| FAX | – | 101 | HALF-BRIGHT |
| PRINTER | 3 | 005 | – |
| DOCUMENT BOX | – | 019 | HALF-BRIGHT |

FIG.8

| APPARATUS STATUS ID | APPLICATION | ICON ID | DESCRIPTION ID |
|---|---|---|---|
| 1002 | COPY | 3 | 003 |
| | PRINTER | 3 | 004 |
| | DOCUMENT BOX | 3 | 004 |
| | SCANNER | – | 020 |
| | FAX | – | 110 |
| 1003 | COPY | 3 | ... |
| | PRINTER | 3 | ... |
| ... | ... | ... | ... |

FIG.11

| | | |
|---|---|---|
| ic11 | ⚠ | HIGH-URGENCY ERROR<br>ENTIRE SYSTEM DISABLED |
| ic12 | ❗ | SYSTEM PARTIALLY DISABLED<br>LOW-URGENCY ERROR |
| ic13 | ○ | APPLICATION IN OPERATION |

FIG.12

| LED | CONDITION |
|---|---|
| RED LIGHT | ⊙ DISPLAYED FOR ONE OR MORE APPLICATION STATUSES OR ⚠ DISPLAYED FOR APPARATUS STATUS |
| YELLOW FLASHING LIGHT | ⊙ DISPLAYED FOR APPARATUS STATUS |
| BLUE LIGHT BLUE FLASHING LIGHT | ○ DISPLAYED FOR PRINTER APPLICATION STATUS |
| OFF | NO ICONS DISPLAYED |

FIG.13B

STATUS MONITOR — di11

| APPARATUS INFORMATION | ⚠ ACTIVE JOBS | JOB HISTORY | CONTACT/CONSUMABLE SUPPLIES INFORMATION | CLOSE |

COPY/DOCUMENT BOX | PRINTER | OTHER

STATUS | No. | USER NAME | DOCUMENT NAME | ORIGINAL QUANTITY | TIME

PRINTING | 9999 | 16 BYTES MAX | 16 BYTES MAX | 9999 | 9999 | 9999 MIN

001 | 9999 | 16 BYTES MAX | 16 BYTES MAX | 9999 | 9999 | 9999 MIN

⚠ ERROR | 9999 | 16 BYTES MAX | 16 BYTES MAX | 9999 | 9999 | 9999 MIN

AN ERROR HAS OCCURRED. PLEASE PRESS [ERROR] KEY.

PRINT WAITING : 2 JOBS

1/1  ▲PREVIOUS  ▼NEXT

FIG.13C

STATUS MONITOR — di12

| APPARATUS INFORMATION | ACTIVE JOBS | JOB HISTORY | CONTACT/CONSUMABLE SUPPLIES INFORMATION | CLOSE |

COPY/DOCUMENT BOX | PRINTER | OTHER

| RESULT | No. | USER NAME | DOCUMENT NAME | PAGES | QUANTITY |
|---|---|---|---|---|---|
| 001 COMPLETED | 9999 | 16 BYTES MAX | 16 BYTES MAX | 9999 | 9999 |
| 002 COMPLETED | 9999 | 16 BYTES MAX | 16 BYTES MAX | 9999 | 9999 |
| 003 PRINTING INTERRUPTED | 9999 | 16 BYTES MAX | 16 BYTES MAX | 9999 | 9999 |
| 004 COMPLETED | 9999 | 16 BYTES MAX | 16 BYTES MAX | 9999 | 9999 |
| 005 PRINTING INTERRUPTED | 9999 | 16 BYTES MAX | 16 BYTES MAX | 9999 | 9999 |
| 006 PRINTING INTERRUPTED | 9999 | 16 BYTES MAX | 16 BYTES MAX | 9999 | 9999 |
| 007 COMPLETED | 9999 | 16 BYTES MAX | 16 BYTES MAX | 9999 | 9999 |

▲ PREVIOUS   1/2   ▼ NEXT

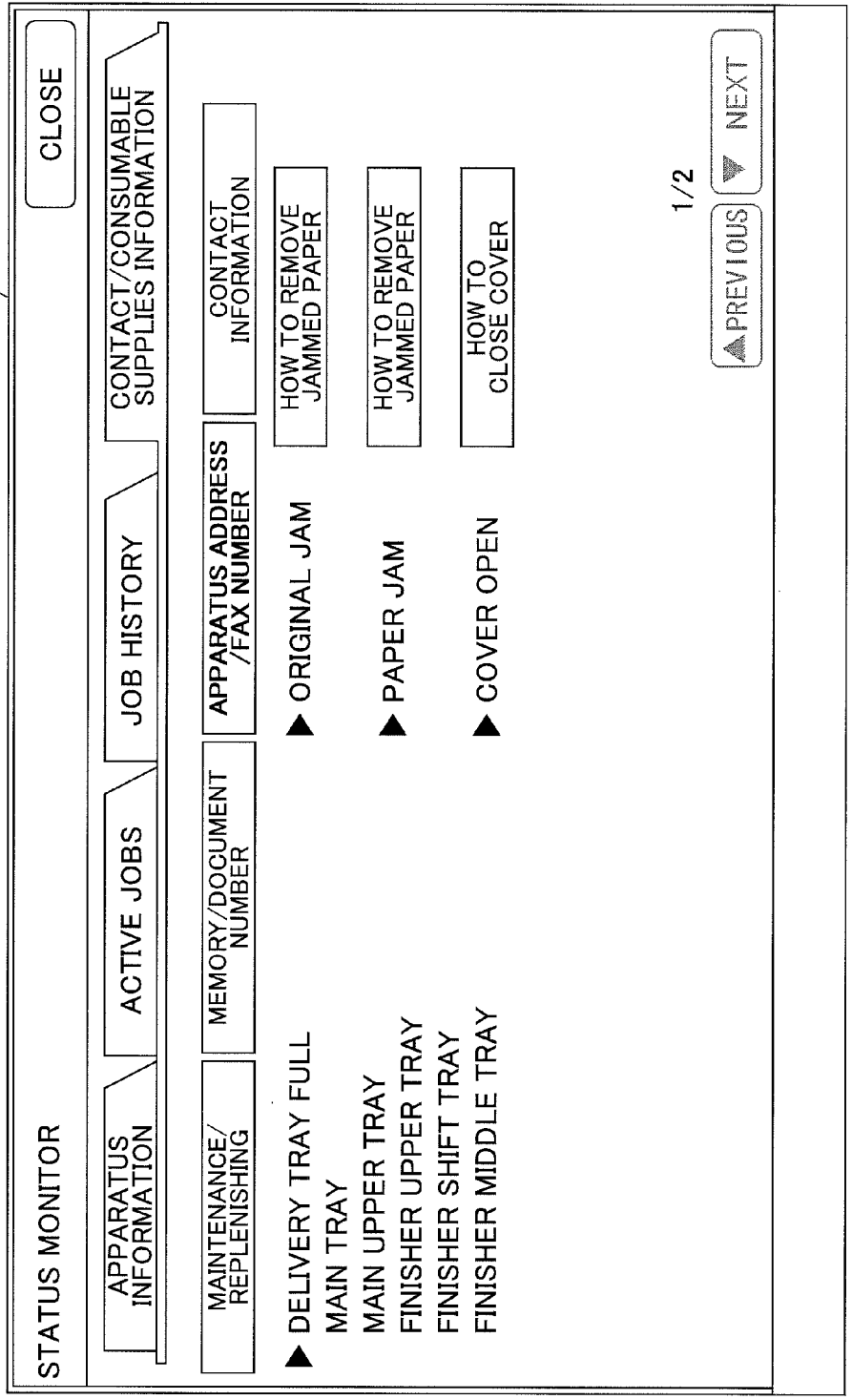

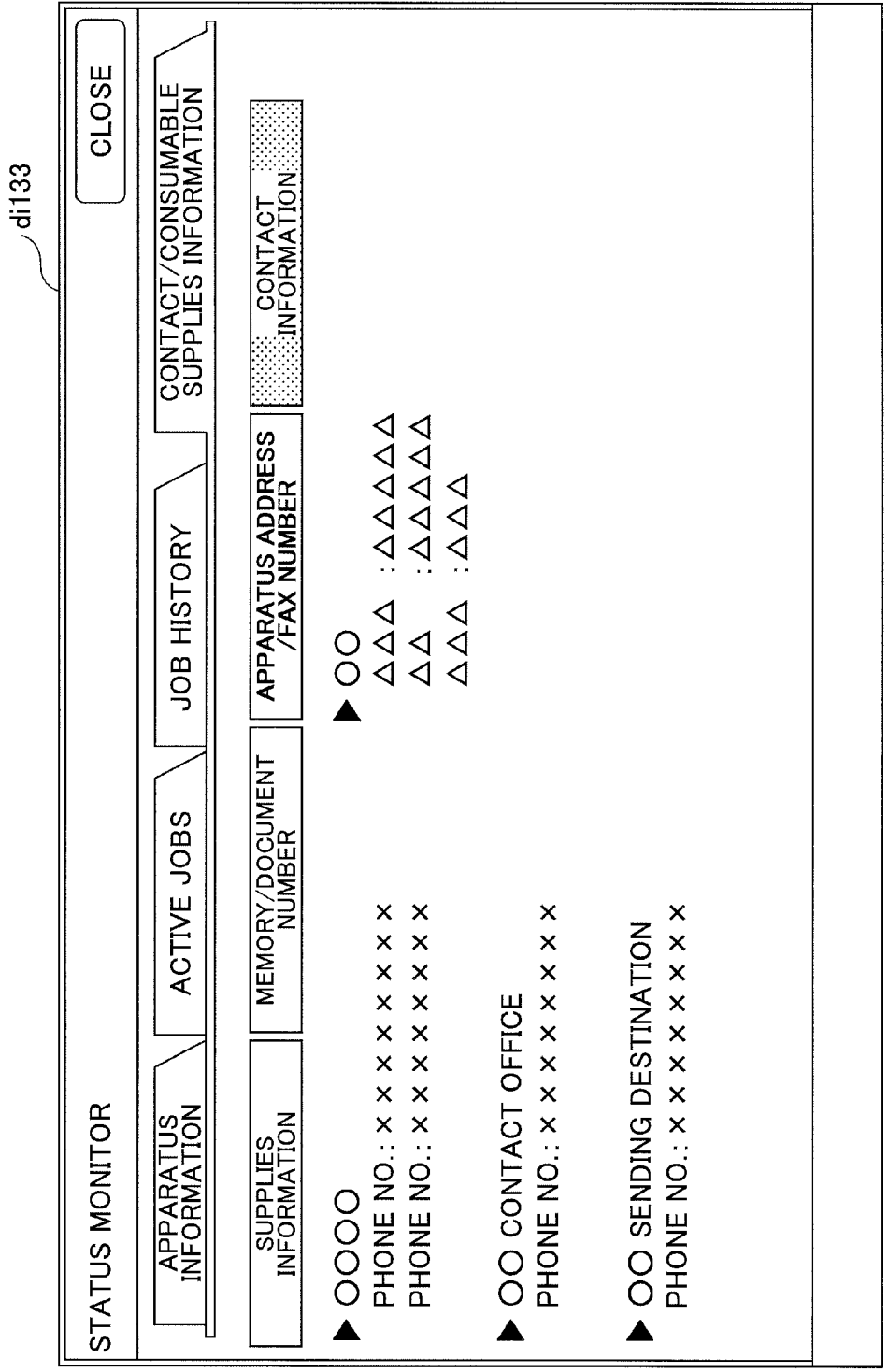

IMAGE PROCESSING APPARATUS, IMAGE PROCESSING METHOD, AND COMPUTER-READABLE MEDIUM FOR ARRANGING STATUS DISPLAY TO INCLUDE STATUS ICON AND STATUS DESCRIPTION

BACKGROUND OF THE INVENTION

1. Field of the Invention

The disclosures herein relate generally to an image processing apparatus and an image processing method, and particularly to an image processing apparatus and an image processing method for controlling a screen for indicating an overall system status.

2. Description of the Related Art

Recently, technologies are being developed for enhancing the multi-functionality of the multifunction peripheral (MFP) using a Software Development Kit (SDK) to install functions such as an application added by a third party vendor or a web browsing function in addition to standard applications such as copy, scan, fax, and print applications.

The MFP may have the function of notifying a user of the status of an application so that the user may be aware of the availability of the application.

For example, Japanese Laid-Open Patent Publication No. 2010-39761 discloses an application platform for controlling a screen to display the statuses of applications as "enabled" or "disabled."

However, the conventional image processing apparatus merely indicates a list of applications and their availability. That is, the display has to be switched to another screen in order to determine the overall status of the apparatus. Also, the availability of an application is conventionally indicated by the color of a light emitting diode (LED) of a corresponding hard function key, but detailed information on the status of the application cannot be determined unless the corresponding application screen is displayed.

SUMMARY OF THE INVENTION

It is a general object of at least one embodiment of the present invention to provide an image processing apparatus that substantially obviates one or more problems caused by the limitations and disadvantages of the related art.

One object of an embodiment of the present invention is to improve the visibility of an apparatus status and an application status in an image processing apparatus.

In one embodiment of the present invention, an image processing apparatus includes a system managing unit configured to manage an apparatus status of apparatus hardware; an acquiring unit configured to acquire application status information of an application from the application and apparatus status information from the system managing unit; an input unit configured to accept a display request for displaying a status monitor screen indicating an overall system status; a screen generating unit configured to receive the display request and generate the status monitor screen based on the application status information and the apparatus status information acquired by the acquiring unit, the status monitor screen including an application status display and an apparatus status display; and a display unit configured to display the status monitor screen generated by the screen generating unit.

In another embodiment of the present invention, an image processing method includes the steps of acquiring application status information of an application from the application and apparatus status information of apparatus hardware from a system managing unit; accepting a display request for displaying a status monitor screen indicating an overall system status via an input unit; generating the status monitor screen in response to the display request based on the acquired application status information and the acquired apparatus status information, the status monitor screen including an application status display and an apparatus status display; and displaying the generated status monitor screen.

In another embodiment of the present invention, a computer-readable medium has a program stored thereon that is executable by a computer to cause the computer to execute an image processing method including the steps of acquiring application status information of an application from the application and apparatus status information of apparatus hardware from a system managing unit; accepting a display request for displaying a status monitor screen indicating an overall system status via an input unit; generating the status monitor screen in response to the display request based on the acquired application status information and the acquired apparatus status information, the status monitor screen including an application status display and an apparatus status display; and displaying the generated status monitor screen.

BRIEF DESCRIPTION OF THE DRAWINGS

Other objects and further features of embodiments will be apparent from the following detailed description when read in conjunction with the accompanying drawings, in which:

FIG. 3 is a table showing an example of status information used in the first embodiment;

FIG. 4 is a table showing an example of icon ID and description ID information corresponding to the status information;

FIG. 5 is a table showing an example of icon image information used in the first embodiment;

FIG. 6 is a table showing an example of status description information used in the first embodiment;

FIG. 7 is a table showing an example of screen configuration information used in the first embodiment;

FIG. 8 is a table showing an example of status association information used in the first embodiment;

FIG. 11 is a table showing exemplary icons used in the first embodiment;

FIG. 12 is a table showing operations of a light emitting unit in conjunction with the icons;

FIGS. 13A-13C are diagrams showing exemplary screen transitions from the status monitor screen to an active job list screen and a job history list screen;

FIGS. 14A-14G are diagrams showing exemplary screen transitions from the status monitor screen to a contact/consumable supplies information screen;

DESCRIPTION OF THE PREFERRED EMBODIMENTS

Figure 1:
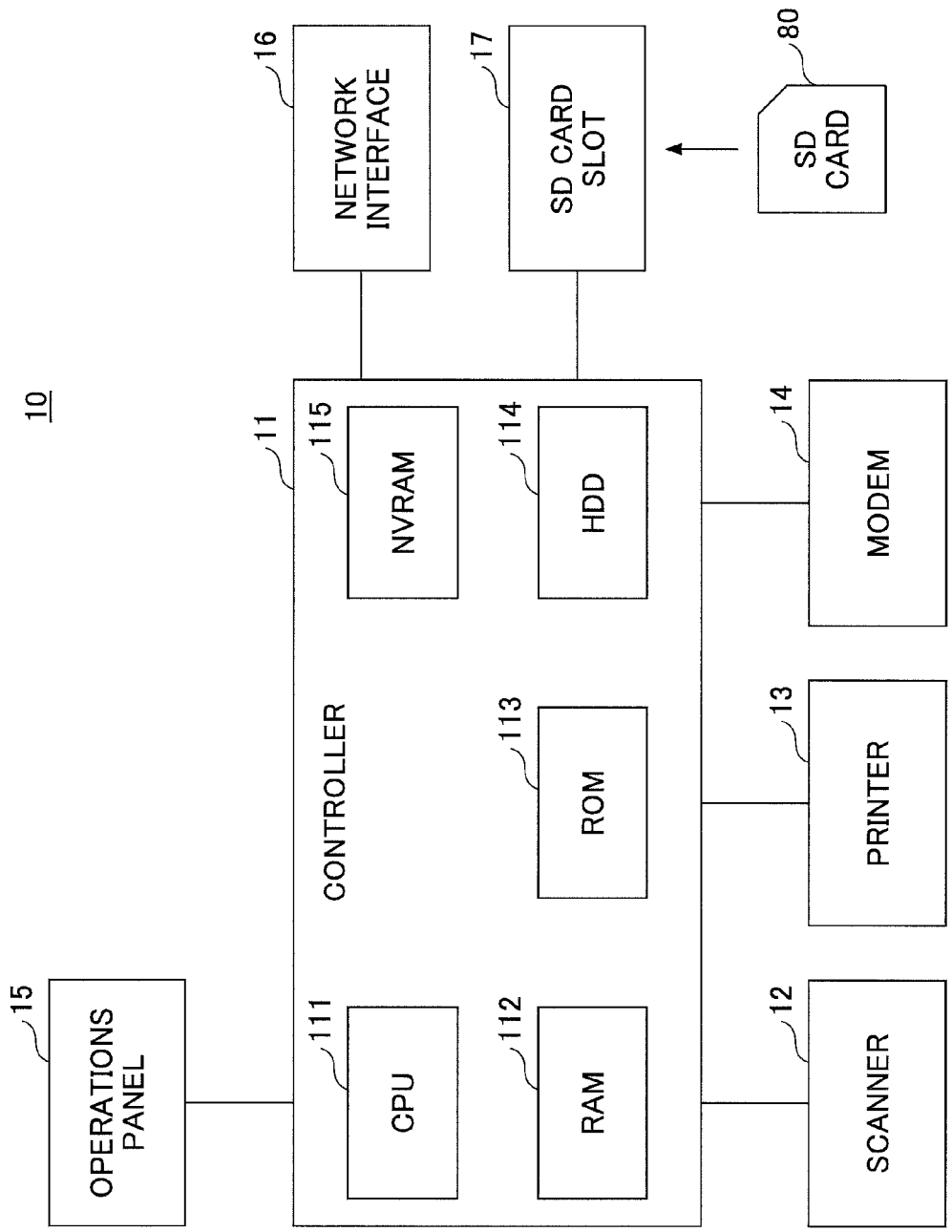
FIG. 1 is a block diagram showing a hardware configuration of an image processing apparatus according to a first embodiment of the present invention.

Embodiments of the present invention are described below with reference to the accompanying drawings.
[First Embodiment]
In the following, an image processing apparatus according to a first embodiment of the present invention is described.
<Hardware Configuration>
FIG. 1 is a block diagram showing an exemplary hardware configuration of an image processing apparatus according to the first embodiment. In FIG. 1, an image processing apparatus 10 includes a controller 11, a scanner 12, a printer 13, a modem 14, an operations panel 15, a network interface 16, and a SD card slot 17. The image processing apparatus 10 may be a MFP, for example.

The controller 11 includes a CPU (Central Processing Unit) 111, a RAM (Random Access Memory) 112, a ROM (Read-Only Memory) 113, a HDD (Hard Disk Drive) 114, and a NVRAM (Non-Volatile RAM) 115.

The ROM 113 stores programs and data used by the programs. The RAM 112 is used as a storage area in which programs may be loaded and a work area for the loaded programs.

The CPU 111 enables various functions by processing the programs loaded on the RAM 112. The HDD 114 stores programs and data used by the programs. The NVRAM 115 stores various types of setting information, for example.

The scanner 12 is configured to scan and obtain image data of a document. The printer 13 is configured to print data on a print sheet. The modem 14 is configured to establish connection through a telephone line to enable facsimile transmission and reception of image data.

The operations panel 15 includes an input unit such as a button for accepting a user input and a display unit such as a liquid crystal panel. The network interface 16 is configured to establish connection with a wired or wireless network such as a LAN (Local Area Network).

The SD card slot 17 is used to read a program stored in an SD card 80. In the image processing apparatus 10 of the present embodiment, a program stored in the SD card 80 may be loaded in the RAM 112 and executed in addition to the programs stored in the ROM 113.

Figure 2:
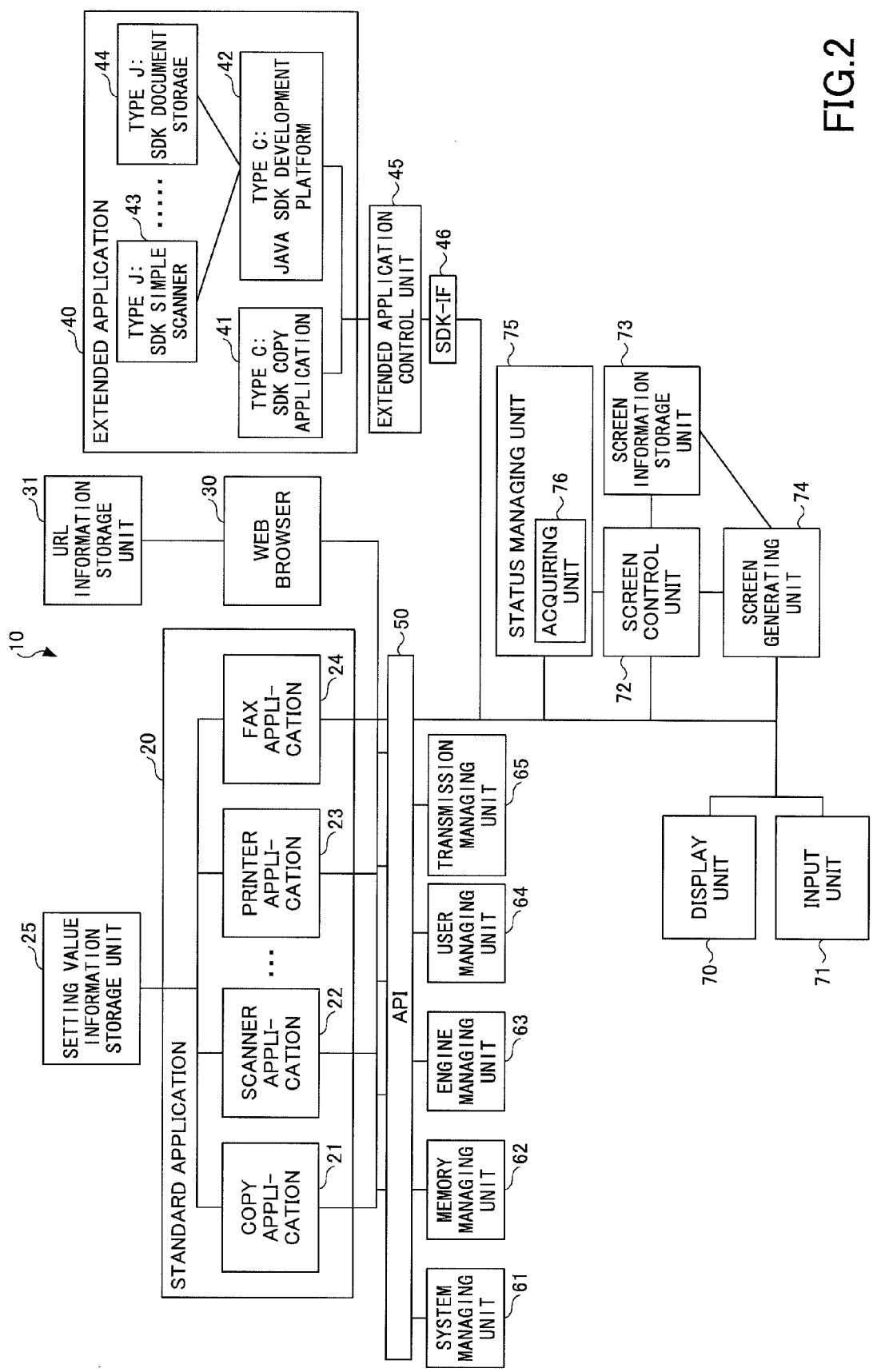
FIG. 2 is a block diagram showing a functional configuration of the image processing apparatus according to the first embodiment.

In other embodiments, the SD card 80 may be replaced by another type of storage medium (e.g., CD-ROM or USB memory). In this case, the SD card slot 17 may be replaced by a drive unit for the corresponding storage medium.
<Functional Configuration>
FIG. 2 is a block diagram showing an exemplary functional configuration of the image processing apparatus 10. The image processing apparatus 10 includes a standard applications 20, a setting value information storage unit 25, a web browser 30, a URL information storage unit 31, an extended applications 40, an extended applications control unit 45, a SDK-IF 46, an API (Application Program Interface) 50, a system managing unit 61, a memory managing unit 62, an engine managing unit 63, a user managing unit 64, a transmission managing unit 65, a display unit 70, an input unit 71, a screen control unit 72, a screen information storage unit 73, a screen generating unit 74, and a status managing unit 75.

The standard applications 20 includes applications that are normally installed in the image processing apparatus 10 such as a copy application 21, a scanner application 22, a printer application 23, and a fax application 24, for example.

The standard applications 20 generates operation screens, executes application jobs, and registers or accesses setting values in the setting value information storage unit 25. It is noted that one or more setting values that are registered in an application beforehand are referred to as a "macro" and a function for accessing the macro is referred to as a "macro function." The standard applications 20 uses the API 50 to output data to the display unit 70.

The setting value information storage unit 25 stores pre-registered setting values of the standard applications 20.

The web browser 30 establishes communication with an HTTP server to display a web page. The web browser 30 obtains URL information from the URL information storage unit 31 and outputs a corresponding web page URL to the display unit 70. The URL information storage unit 31 stores URL information of the web page URL to be displayed by the browser 30.

The extended applications 40 includes applications that may be added using the SDK (Software Development Kit) such as a SDK copy application 41, a Java SDK development platform 42, a SDK simple scanner 43, and a SDK document storage 44, for example. The extended applications 40 may generate an operation screen and execute an application job. It is noted that a SDK application that is developed using the C language is referred to as "Type C" and a SDK application developed using Java (registered trademark) is referred to as "Type J."

The SDK copy application 41 is a Type C SDK application developed using the C language. The Java SDK development platform 42 is a Type C SDK application developed using the C language. The Java SDK development platform 42 is a Java VM platform for enabling installation of an SDK application that is developed using Java (registered trademark).

The SDK simple scanner 43 is a Type J SDK application developed using Java (registered trademark).

The SDK document storage 44 is a Type J SDK application that is developed using Java (registered trademark).

The extended applications control unit 45 controls and manages the SDK applications. The SDK-IF 46 is an interface between the SDK applications (e.g., SDK simple scanner) and the various functional units such as the managing units 61-65 and 75, the input unit 71, and the display unit 70.

The extended applications control unit 45 directly controls Type C SDK applications. However, Type J SDK applications are installed in the Java SDK development platform 42, which is a Type C SDK application, and the extended applications control unit 45 controls the Type J SDK applications via the Java SDK development platform 42.

The system managing unit 61 is configured to manage the overall system. The system managing unit 61 manages the statuses of hardware components of the image processing apparatus 10 such as the toner supply level, the paper supply level, the ADF (Automatic Document Feeder) operation status, and the communication line connection status, for example. The memory managing unit 62 manages memory and generates file data.

The engine managing unit 63 controls document scanning operations. The user managing unit 64 performs user authentication and manages the scanner transmission destination, for example. The transmission managing unit 65 controls data transmission from the image processing apparatus 10 to other apparatuses.

The display unit 70 displays a screen generated by the screen generating unit 74 such as a status monitor screen, which is described below. The status monitor screen indicates the overall system status of the image processing apparatus 10 and includes an apparatus status display and one or more application status displays of applications installed in the image processing apparatus 10 within one screen.

The display unit 70 may display an operation screen of the standard applications 20, an operation screen of the extended applications 40, or a web page output by the web browser 30, for example.

The input unit 71 detects when a user interface component (e.g., button or tab) within the status monitor screen is pressed. The input unit 71 accepts the pressing of the user interface component as an operation request to activate the corresponding user interface component function. The input unit 71 may also accept inputs from the operation screens of the standard applications 20 and the extended applications 40 and inputs from a web page, for example.

The screen control unit 72 controls a screen displayed by the display unit 70. For example, upon receiving a request from the input unit 71 to display the status monitor screen, the screen control unit 72 may send a request to the screen generating unit 74 to generate the status monitor screen. Also, the screen control unit 72 may request the display of an application screen when a select button within the status monitor screen is selected, for example.

The screen information storage unit 73 stores screen configuration information such as the layout of the status monitor screen. For example, the status monitor screen may have an icon image, a status description, and a select button displayed in association with each of the apparatus status display and application status displays. The screen information storage unit 73 also stores icon image information and status description information.

Additionally, the screen information storage unit 73 stores apparatus status information and application status information obtained by the status managing unit 75. In a preferred embodiment, the screen information storage unit 73 may store status association information that indicates an association between a predetermined apparatus status and an application status. It is noted that the various items of information stored in the screen information storage unit 73 are described in detail below.

The screen generating unit 74 may respond to a status monitor screen generation request from the screen control unit 72 and generate the status monitor screen, which may display icons, status descriptions, and select buttons, for example, based on the screen configuration information obtained from the screen information storage unit 73. The screen generating unit 74 outputs the generated screen to the display unit 70.

The status managing unit 75 includes an acquiring unit 76 that acquires status information of the image processing apparatus 10. The acquiring unit 76 acquires apparatus status information of hardware components of the image processing apparatus 10 from the system managing unit 61. The acquiring unit 76 acquires application status information from the various applications installed in the image processing apparatus 10. Status information includes information indicating various statuses such as an error status or a job execution status.

The acquiring unit 76 may acquire such status information periodically or when an error occurs in an application or the apparatus hardware. The acquiring unit 76 stores the acquired status information in the screen information storage unit 73.

The status managing unit 75 also controls light emission of a light emitting unit 91 (see FIG. 9) based on the acquired status information as is described below.

It is noted that the standard applications 20, the web browser 30, the extended applications 40, the system managing unit 61, the memory managing unit 62, the engine managing unit 63, the user managing unit 64, the transmission managing unit 65, the screen control unit 72, the screen generating unit 74, the status managing unit 75, and the extended applications control unit 45 may be realized by the CPU 111, the RAM 112 including a work memory, and the HDD 114 that stores various programs, for example. The setting information storage unit 25, the URL information storage unit 31, and the screen information storage unit 73 may be realized by the ROM 113, for example. The display unit 70 and the input unit 71 may be realized by the operations panel 15, for example.

<Data Structure>

In the following, data structures of information used in the present embodiment are described. The screen information storage unit 73 stores information such as status information, icon ID and description ID information, icon image information, and screen configuration information.

FIG. 3 shows an example of status information used in the present embodiment. The status information shown in FIG. 3 includes a status ID identifying the status of the apparatus hardware or an application. The status ID may be acquired by the acquiring unit 76 from the system managing unit 61 or the standard applications 20. It is noted that in the examples described below, the status ID is used as the status information. However, the present invention is not limited to such examples, and other types of information may be used to identify the statuses of the apparatus hardware and applications. The acquiring unit 76 stores the acquired status information in the screen information storage unit 73.

FIG. 4 shows an example of icon ID and description ID information corresponding to the status information. In FIG. 4, the status ID is associated with an icon ID for identifying an icon image and a description ID for identifying a status description.

For example, the screen generating unit 74 may obtain the status information of the apparatus hardware and applications from the status information shown in FIG. 3. Then, the screen generating unit 74 may refer to the information shown in FIG. 4 to identify the icon ID and description ID corresponding to a certain status ID and unambiguously determine the icon image to be displayed and the description to be displayed.

FIG. 5 shows an example of icon image information used in the present embodiment. The icon image information of FIG. 5 associates the icon ID with icon image data for indicating the status of the apparatus hardware or an application. For example, the screen generating unit 74 may refer to the icon image information of FIG. 5 to obtain icon image data corresponding to the icon ID of an icon image to be displayed.

FIG. 6 shows an example of status description information. The status description information of FIG. 6 associates the description ID with a status description of the apparatus hardware or an application. For example, the screen generating unit 74 may refer to the status description information of FIG. 6 to obtain the status description to be displayed based on the description ID.

FIG. 7 shows an example of screen configuration information used in the present embodiment. The screen configuration information of FIG. 7 associates the apparatus status display and the application status displays with an icon ID, a description ID, and a select button brightness. Although not shown, the screen configuration information includes placement information indicating the location of the icons, the descriptions, and the select buttons within the status monitor screen.

In FIG. 7, when the select button brightness is indicated as "half-bright," this means that the corresponding select button cannot be selected. The absence of any indication for the select button brightness means that the corresponding select button should be displayed at normal brightness. The select button brightness is indicated as "half-bright" when there is no icon ID associated with the corresponding apparatus or application status display. The screen generating unit 74 may use the screen configuration information of FIG. 7 to generate a status monitor screen, for example.

It is noted that in some cases, the apparatus status may affect the status of the applications. For example, when the apparatus status indicates a toner empty status, output-related applications such as the copy application and the printer application cannot be executed. Accordingly, the screen information storage unit 73 may store status association information indicating a predetermined icon ID and a predetermined description ID for an application that is associated with a predetermined apparatus status.

FIG. 8 shows an example of such status association information. In FIG. 8, for each apparatus status ID representing a predetermined apparatus status, a predetermined icon ID and a predetermined description ID for one or more applications associated with the predetermined apparatus status are stored.

When an apparatus status ID acquired by the acquiring unit 76 corresponds to one of the predetermined apparatus statuses included in the status association information, the screen generating unit 74 may give priority to the predetermined icon ID and predetermined description ID for the application that is associated with the predetermined apparatus status ID in the status association information upon generating the status monitor screen. That is, the screen generating unit 74 may use the predetermined icon ID and predetermined description ID for the application associated with the predetermined apparatus status ID in the status association information to generate the status monitor screen rather than using the icon ID and description ID information corresponding to the application status information acquired from the application by the acquiring unit 76.

According to an aspect of the present embodiment, the statuses of applications that are associated with a predetermined apparatus status may be accurately conveyed to the user, for example.

<Status Monitor Screen>

In the following, the status monitor screen according to the present embodiment is described.

Figure 9A:
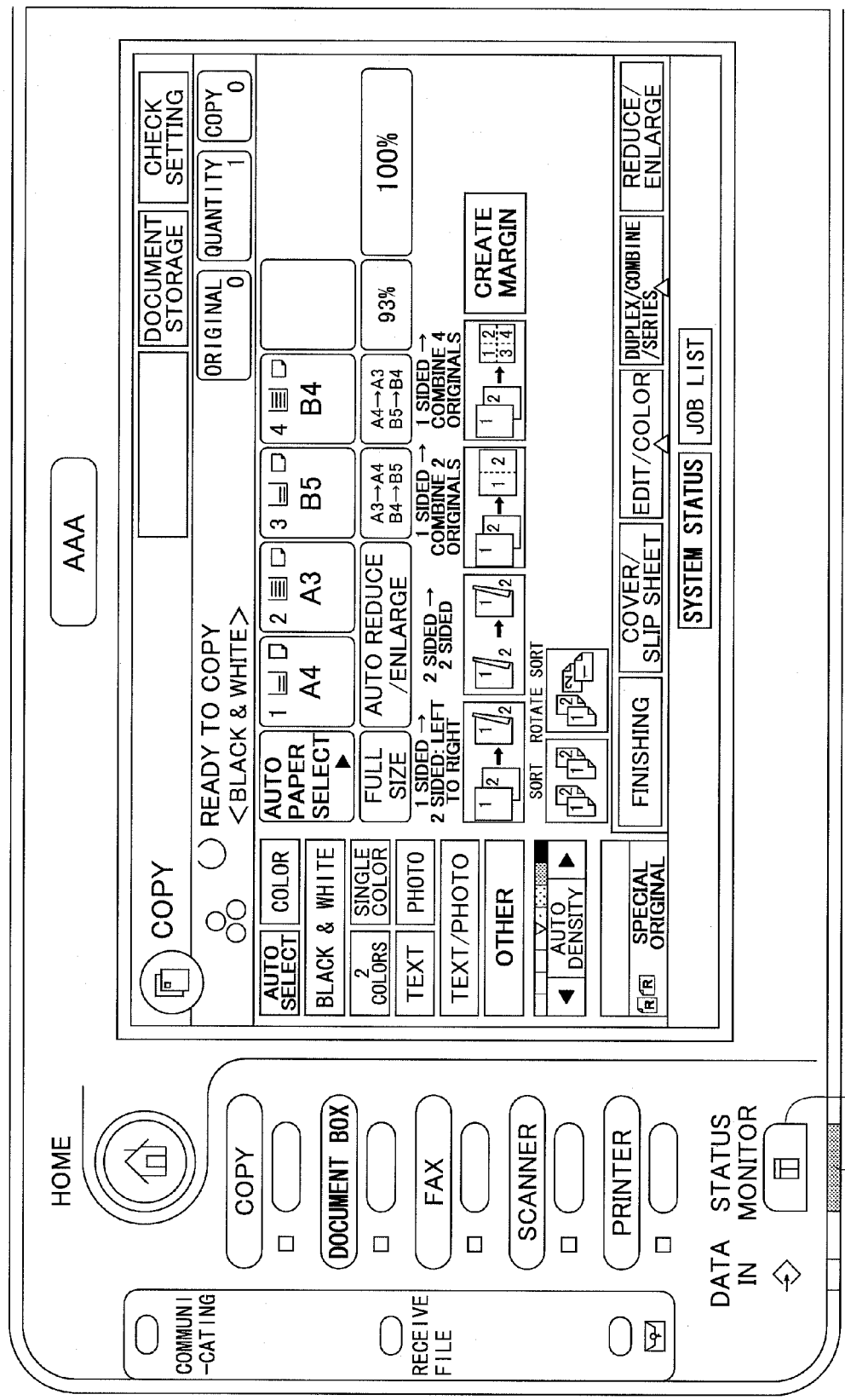
FIGS. 9A-9B are diagrams showing an exemplary screen transition from a given screen to a status monitor screen.
Figure 9B:
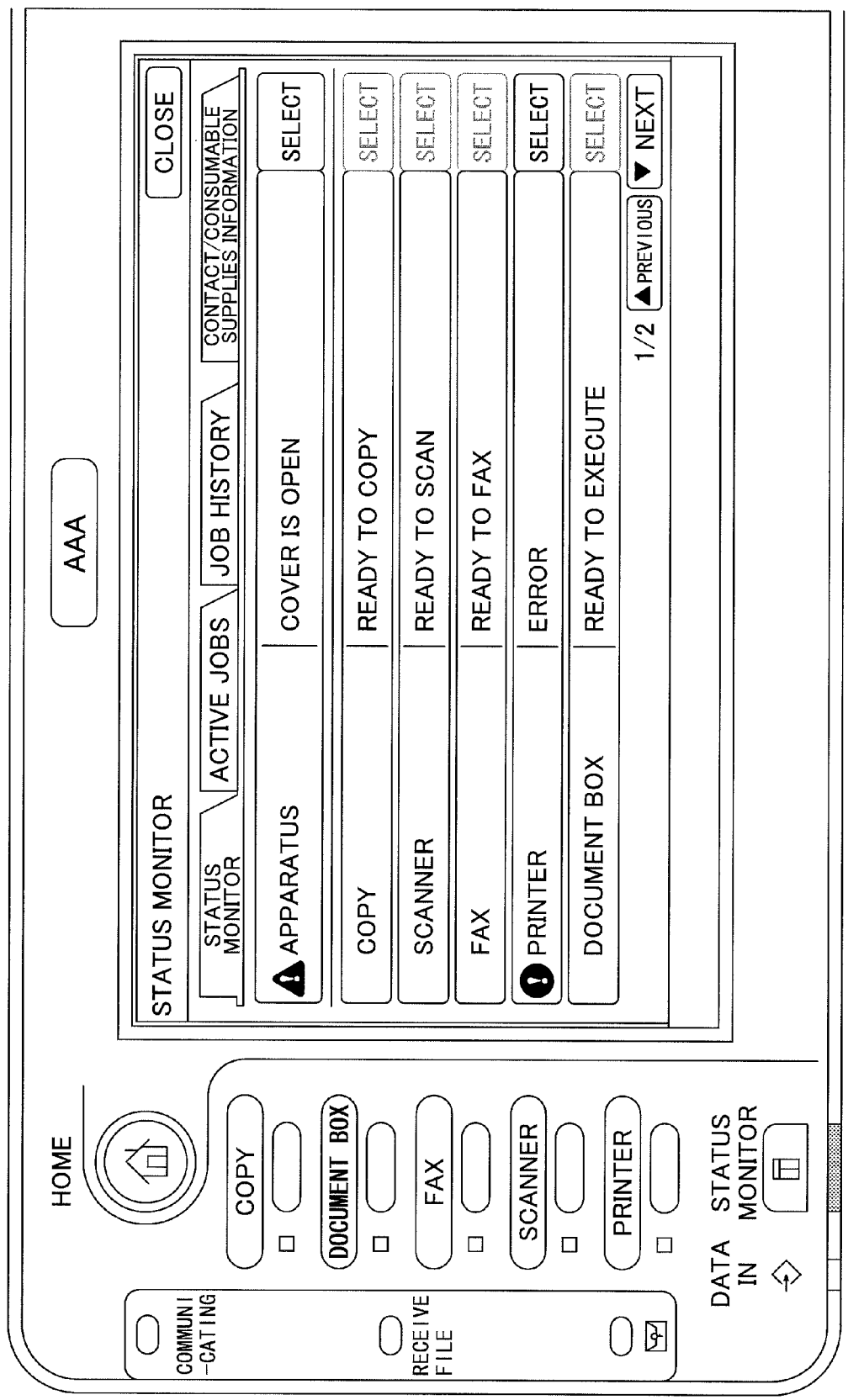

FIGS. 9A-9B illustrate an exemplary screen transition from a given screen to the status monitor screen of the present embodiment. The status monitor screen as is shown in FIG. 9B may be displayed in response to the pressing of a status monitor hard function key (status monitor button) 90 when another screen is displayed as is shown in FIG. 9A. In this way, the display may be switched to the status monitor screen from another screen with one operation (i.e., pressing of the status monitor button 90).

As is shown in FIG. 9A, the light emitting unit 91 is arranged near the status monitor button 90 so that the overall system status may be determined based on the light emitting pattern of the light emitting unit 91 as is described below. The light emitting unit 91 may be a light emitting diode (LED) and the light emission by the light emitting unit 91 may be controlled by the status managing unit 75, for example.

The screen transition of FIGS. 9A-9B may be realized by the input unit 71 accepting the pressing of the status monitor button 90 as a status monitor screen display request and sending the request to the screen control unit 72. Upon receiving the status monitor screen display request, the screen control unit 72 may send a screen generation request to the screen generating unit 74.

In turn, the screen generating unit 74 may use the information stored in the screen information storage unit 73 to generate the status monitor screen and output the generated status monitor screen to the display unit 70. In turn, the display unit 70 may display the generated status monitor screen.

(Status Monitor Screen Examples)

In the following, examples of the status monitor screen according to the present embodiment are described.

Figure 10A:
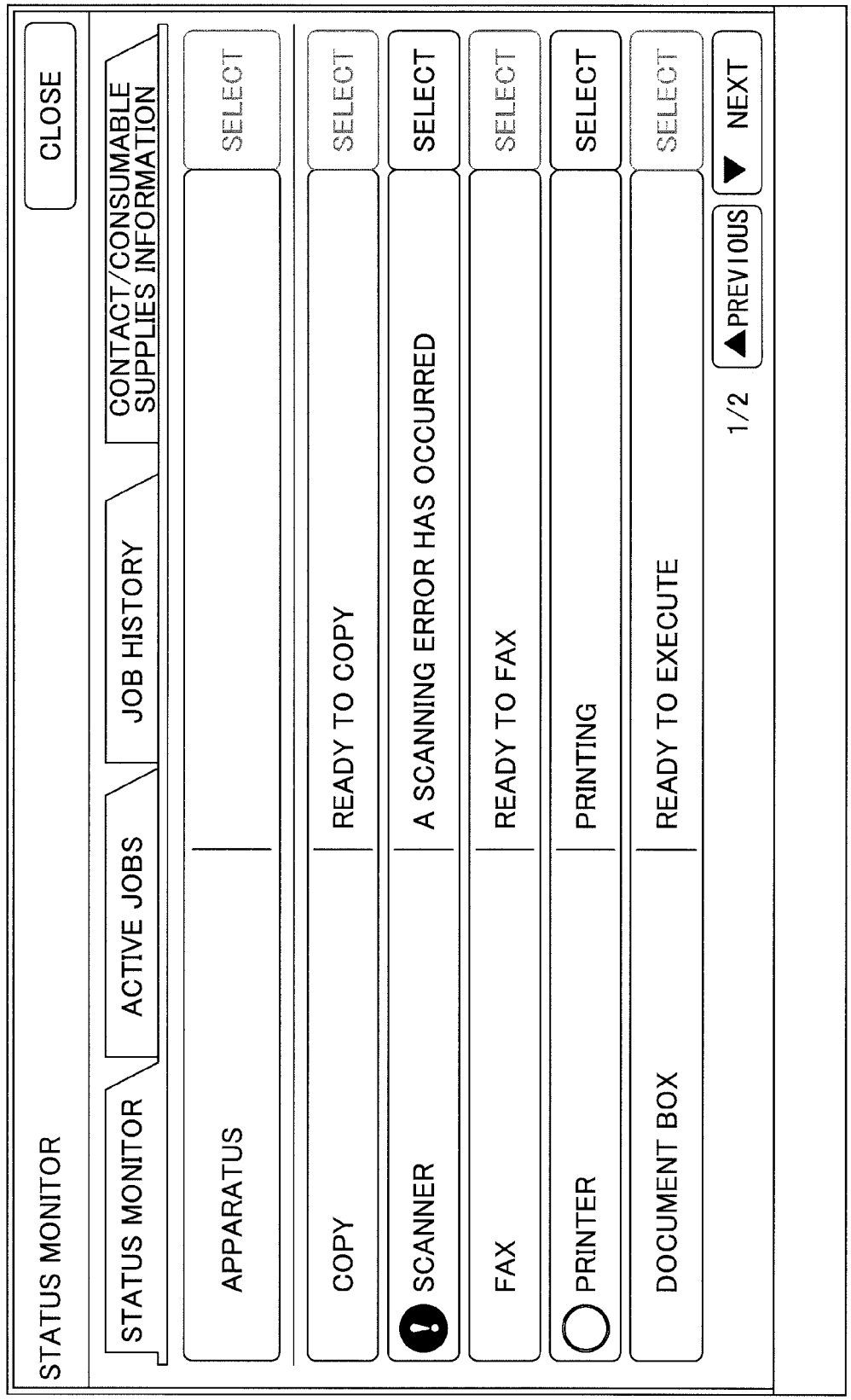
FIGS. 10A-10D are diagrams showing examples of the status monitor screen.

FIG. 10A shows a first example of the status monitor screen according to the present embodiment. The status monitor screen of FIG. 10A illustrates a case in which an error occurs in an application. The status monitor screen of FIG. 10A may be displayed when a scanning error occurs during the execution of a scanning job of the scanner application.

In the status monitor screen of FIG. 10A, the select button for an application status display with an icon is displayed at normal brightness. The other select buttons for the status displays with no icons are displayed at half-bright indicating that they cannot be selected.

Figure 10B:
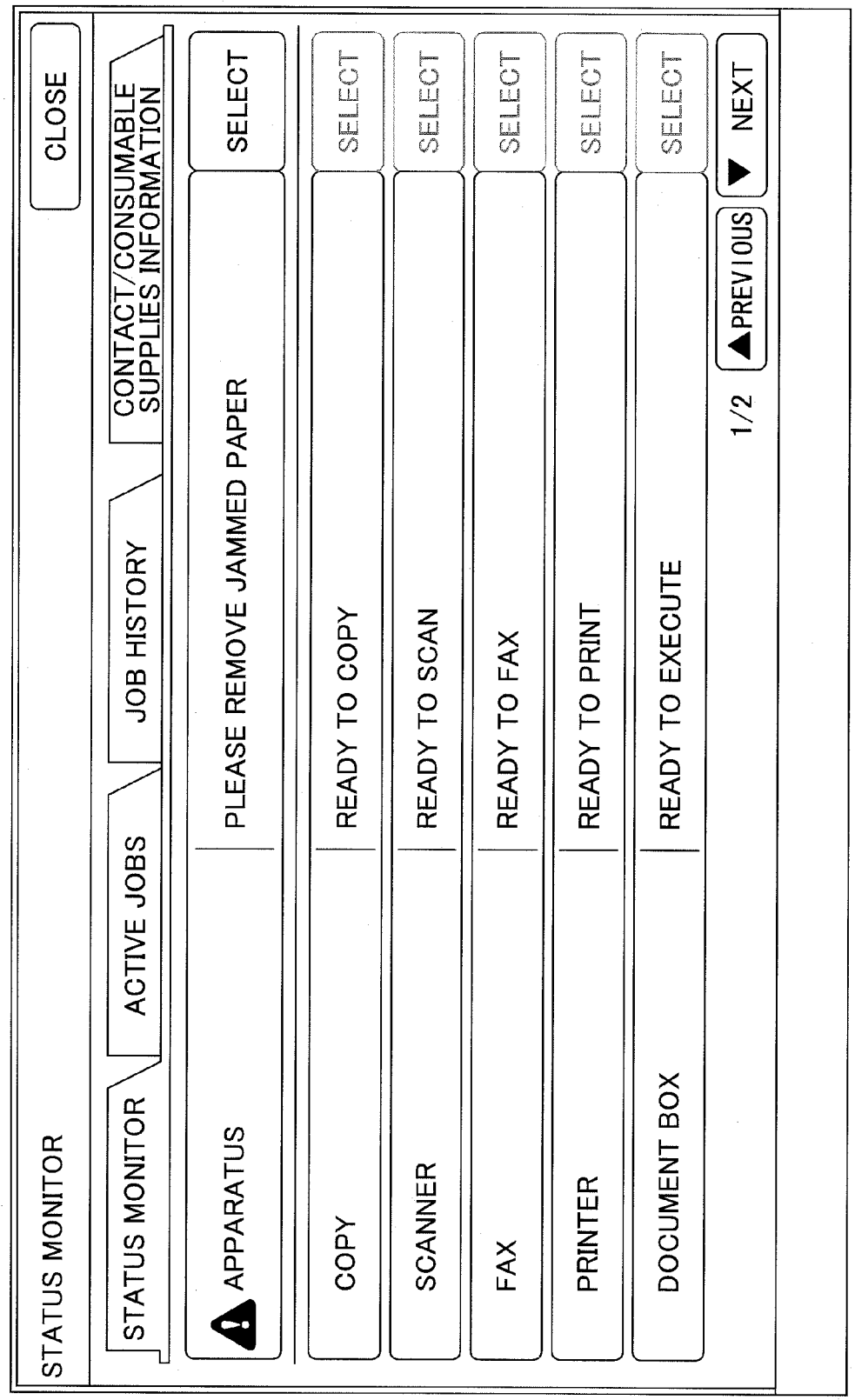

FIG. 10B shows a second example of the status monitor screen. The status monitor screen of FIG. 10B illustrates a case in which an error occurs in the apparatus hardware. The status monitor screen of FIG. 10B may be displayed when a paper jam occurs at the printer 13 corresponding to a hardware component of the image processing apparatus 10.

In the status monitor screen of FIG. 10B, an icon is displayed for the apparatus status so that the select button for checking the apparatus status may be selected, but the other select buttons for checking the status of the applications cannot be selected.

Figure 10C:
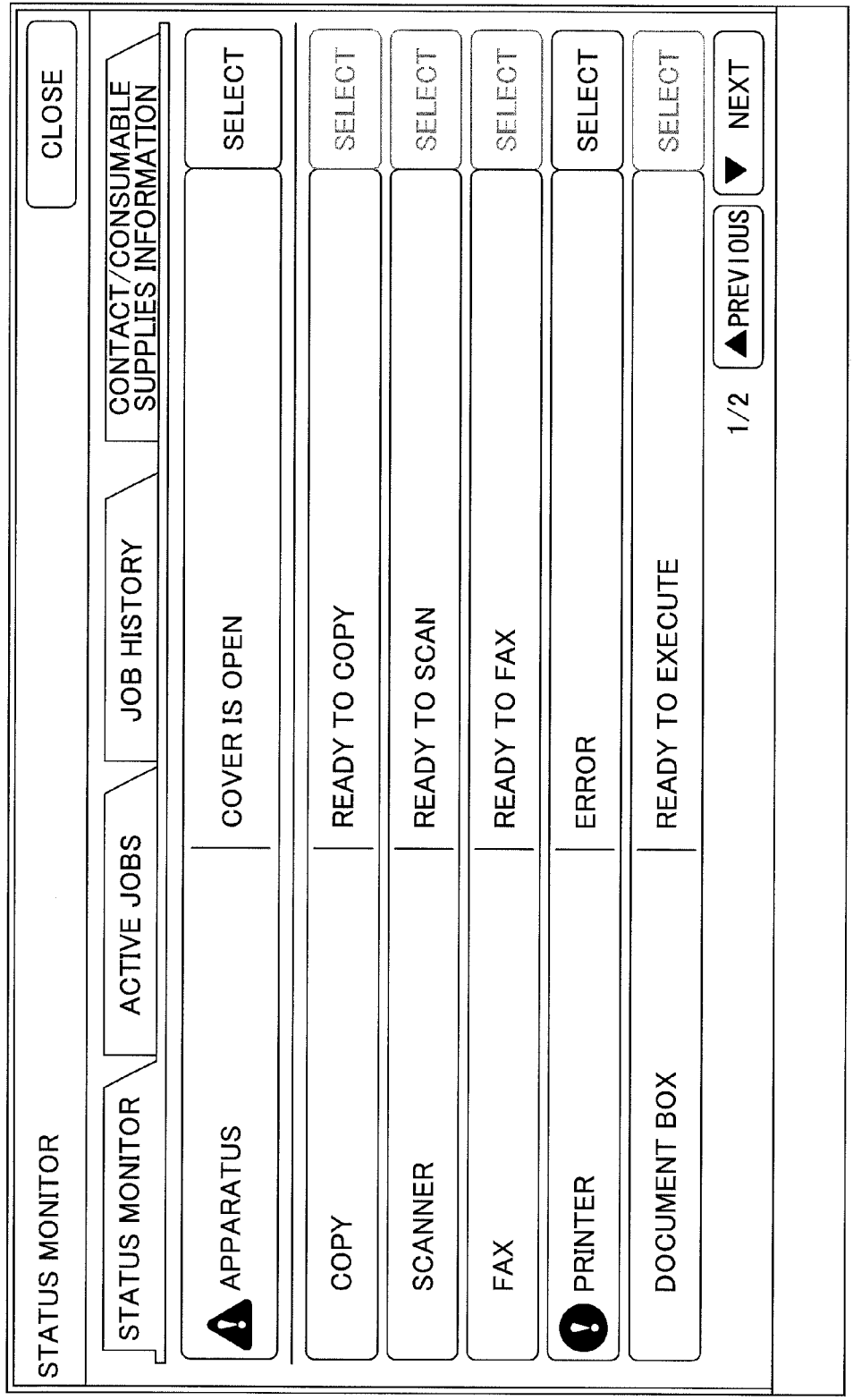

FIG. 10C shows a third example of the status monitor screen. The status monitor screen of FIG. 10C illustrates a case in which an error occurs in the apparatus hardware as well as the printer application. The status monitor screen of FIG. 10C may be displayed when the cover is open and the system managing unit 71 detects this as an error in the apparatus hardware, and the printer application 23 also detects some type of error.

In the status monitor screen of FIG. 10C, icons are displayed for the apparatus status and the printer application status so that the select buttons for checking the apparatus status and the printer application status may be selected. It is noted the status monitor screen of FIG. 10C may be generated based on the image configuration information of FIG. 7.

Figure 10D:
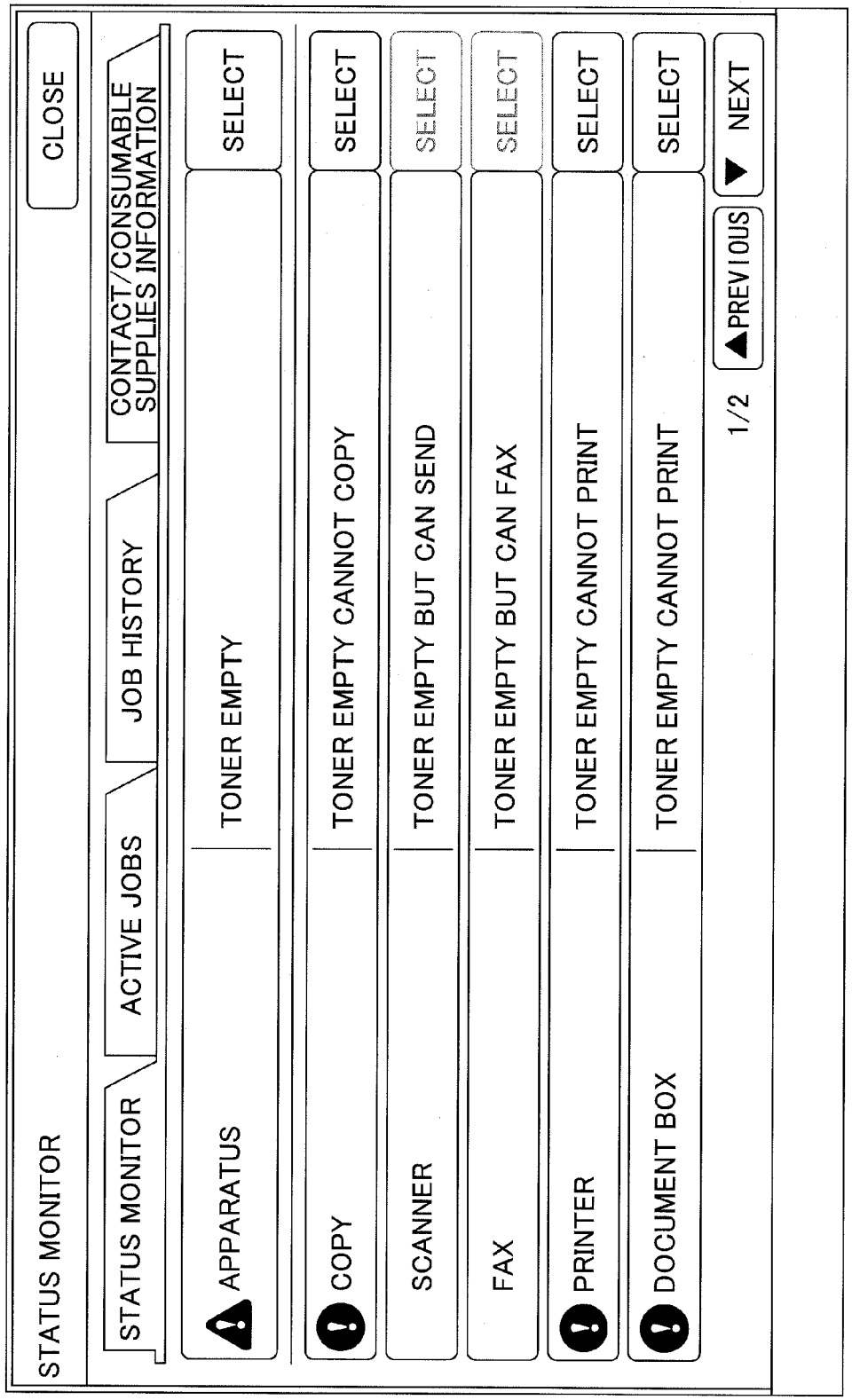

FIG. 10D is a fourth example of the status monitor screen. The status monitor screen of FIG. 10D illustrates a case in which an error occurs in the apparatus and this error affects the statuses of the applications.

The status monitor screen of FIG. 10D may be displayed when a toner empty status has been detected as the apparatus status so that the statuses of output-related applications are affected by this error. Output-related applications may include a copy application, a printer application, and a document box, for example. For the applications that cannot be executed due to the toner empty status, the status monitor screen of FIG. 10D indicates that the applications cannot be executed. As for the applications that can still be executed, the status monitor screen of FIG. 10D indicates the jobs that do not require toner and can therefore be executed.

According to an aspect of the present embodiment, when an error occurs in the apparatus hardware, the status monitor screen may indicate for each application, whether the application itself can be executed and the jobs that may be executed if the application can still be executed so that a user may easily determine the functions that can still be executed.

It is noted that the status monitor screen of FIG. 10D may be generated when the detected apparatus status corresponds to the apparatus status ID "1002" in the status association information of FIG. 8.

<Icon & Light Emitting Unit>

In the following, the icons and the light emitting unit 91 are described.

FIG. 11 is a table describing exemplary icons that may be used in the present embodiment. Icon ic11 may be displayed in a case where a high-urgency error occurs or where the entire apparatus is disabled. A high-urgency error refers to a critical error such as the toner empty status that would disable an application.

Icon ic12 may be displayed in a case where a part of the apparatus is disabled or when a low-urgency error occurs. A low-urgency error refers to a non-critical error such as a toner near-end status that does not require immediate attention but would eventually lead to the disablement of an application after the application is executed a predetermined number of times, for example.

Icon ic13 may be displayed to indicate that an application is currently being executed. The icon ic13 may be displayed as a flashing icon, for example.

FIG. 12 is a table describing the operations of the light emitting unit 91 in conjunction with the icons. The light emitting unit 91 may emit or flash light in conjunction with an apparatus status or an application status indicated in the status monitor screen.

As is shown in FIG. 12, the LED as the light emitting unit 91 may emit red light when the icon ic12 is displayed for an application or when the icon ic11 is indicated for the apparatus status in the status monitor screen. The LED may be flashing yellow light when the icon ic12 is displayed for the apparatus status. The LED may emit or flash blue light when the icon ic13 is displayed for the printer application status.

According to an aspect of the present embodiment, by learning the light emission patterns of the light emitting unit 91, a user may determine the status of the apparatus hardware and applications based on the light emission pattern of the light emitting unit 91.

<Tab Switching>

In the following, tabs that may be displayed in the status monitor screen of the present embodiment are described.

In the present embodiment, by selecting a corresponding tab, the status monitor screen may be switched to an active job list that lists one or more jobs that are currently being executed or a job history list that lists jobs that have been completed, for example. The screen generating unit 74 may create the tabs for enabling such tab switching upon generating the status monitor screen, for example. Tab switching may be realized by the screen control unit 72 receiving a tab switching request from the input unit 71.

Figure 13A:
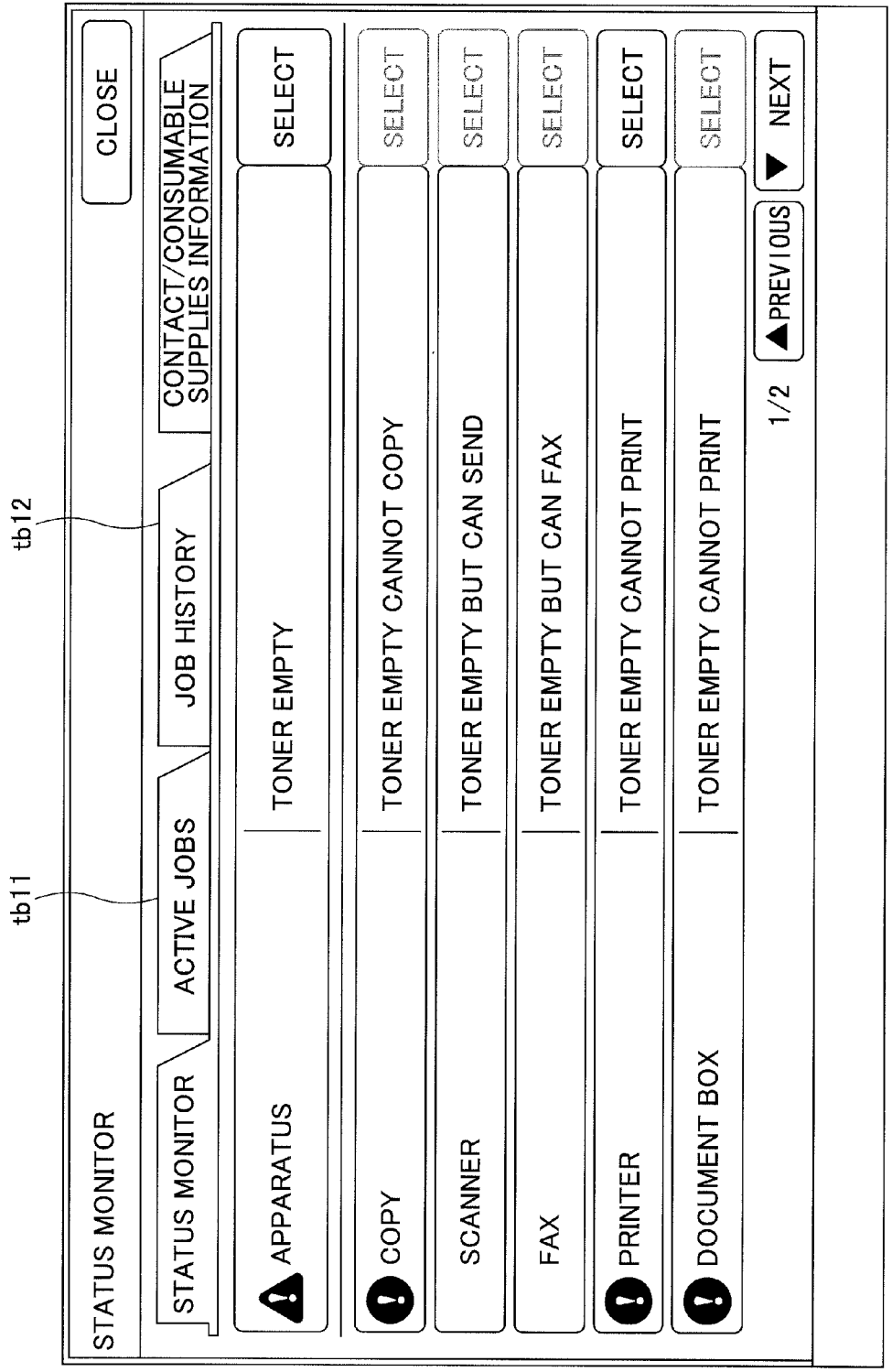

FIGS. 13A-13C show exemplary screen transitions from the status monitor screen to the active job list and the job history list. In FIG. 13A, the status monitor screen includes tab tb11 for switching to the active job list and tab tb12 for switching to the job history list.

When the tab tb11 is pressed, an active job list screen di11 may be displayed as is shown in FIG. 13B. When the tab tb12 is pressed, a job history list screen di12 may be displayed as is shown in FIG. 13C. In this way, a user may view a list of active jobs and a list of completed jobs from the status monitor screen with one operation (i.e., pressing the corresponding tab).

Figure 14A:
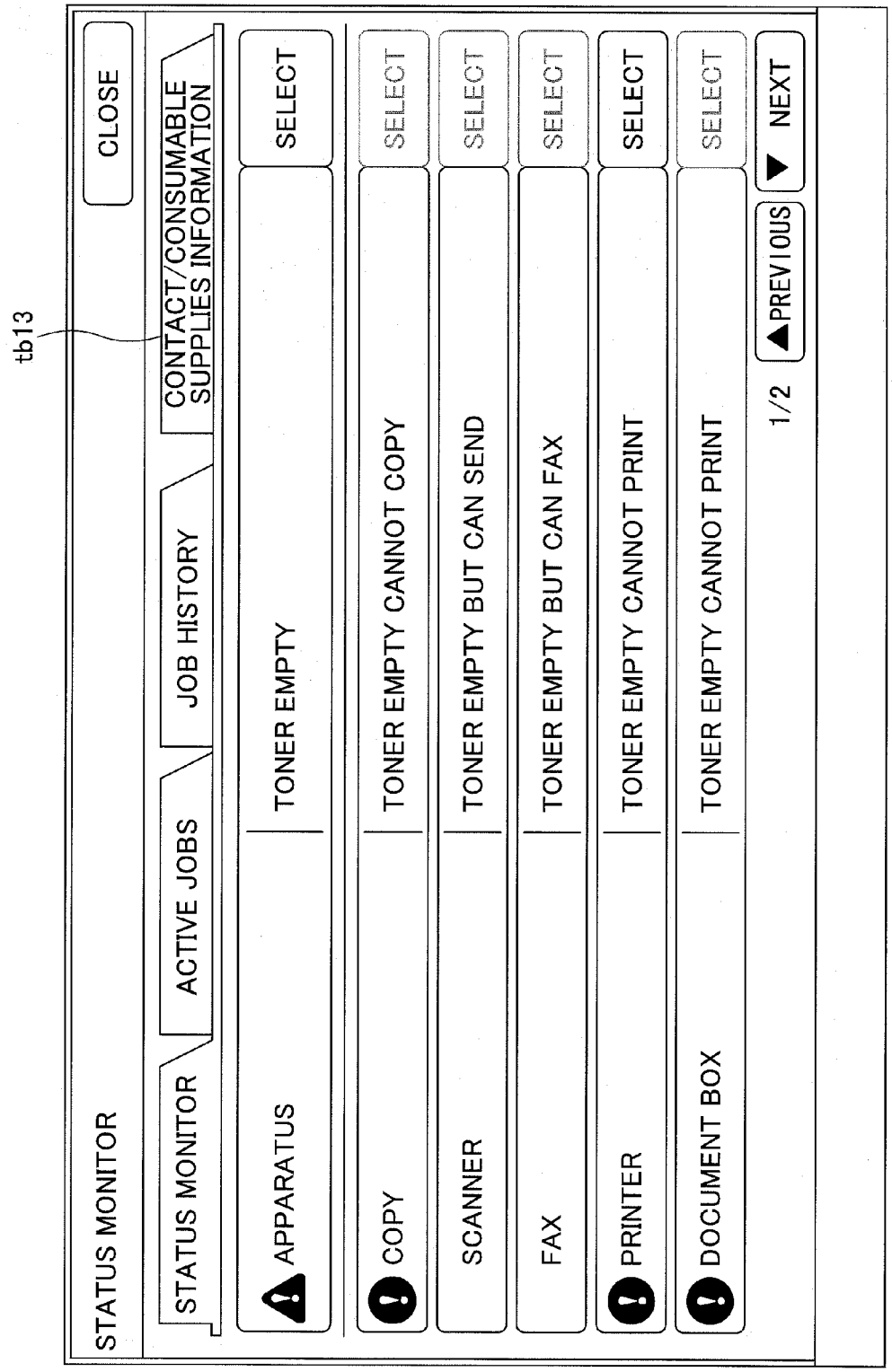
Figure 14B:
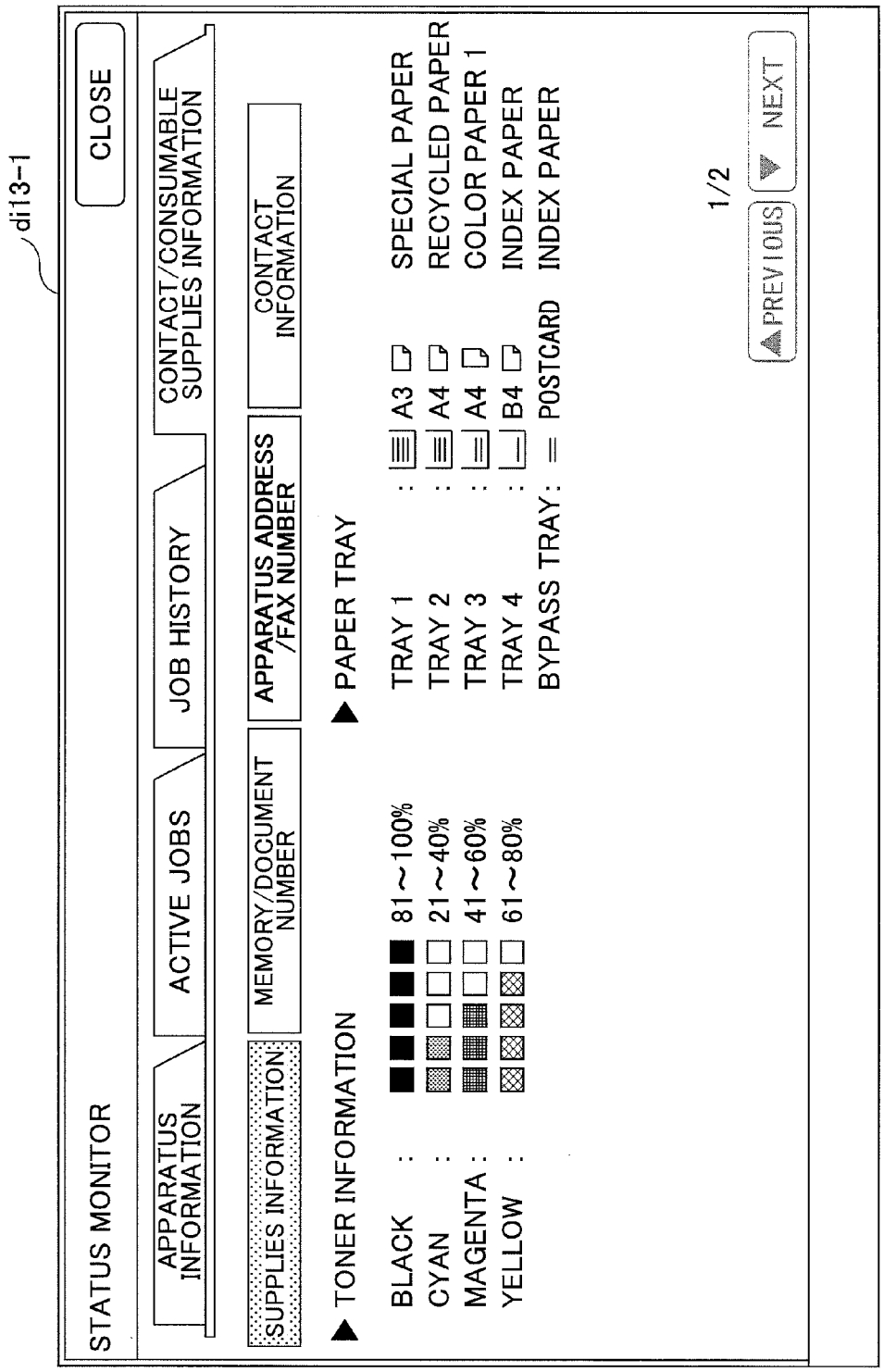
Figure 14C:
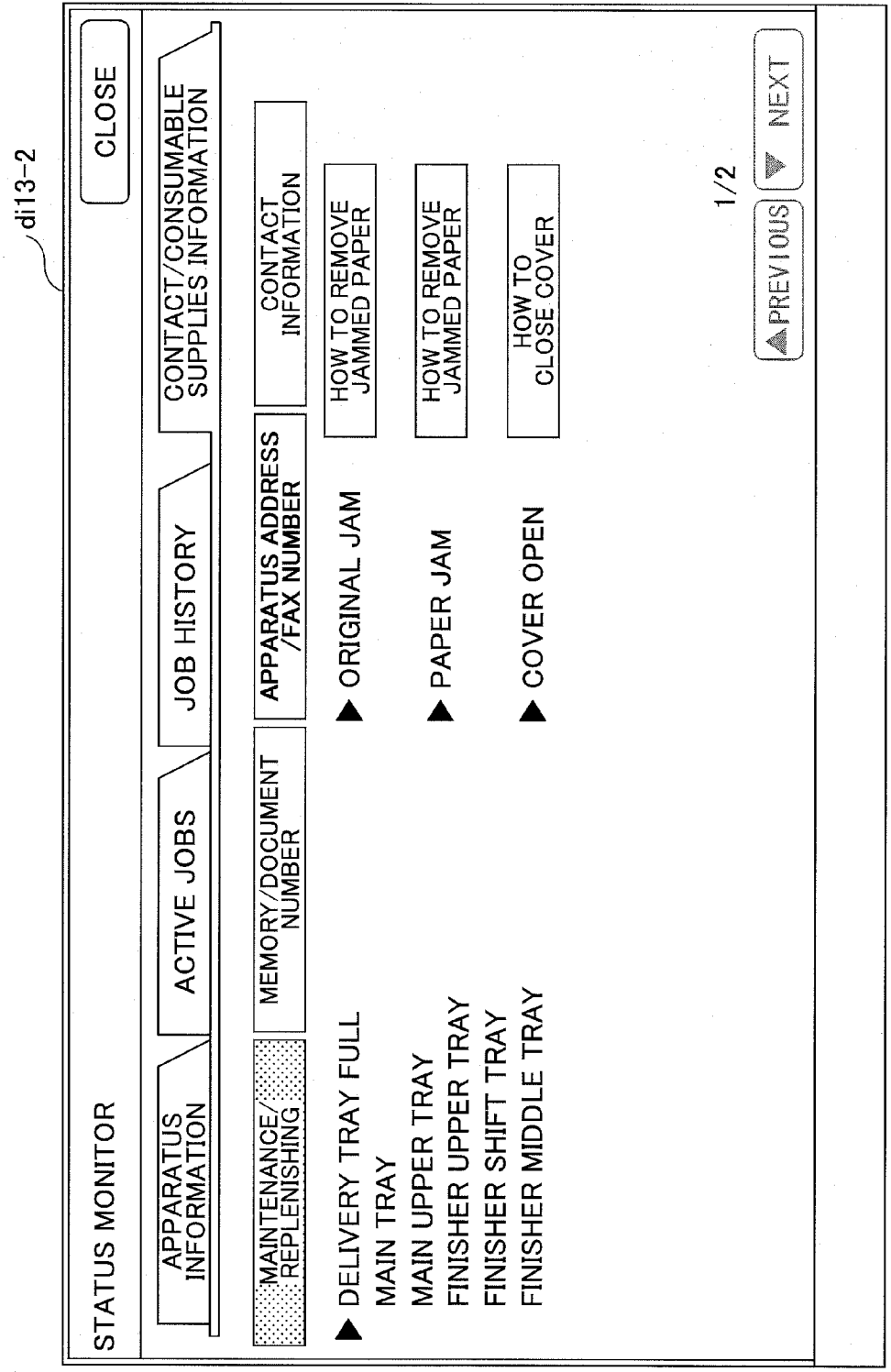

FIGS. 14A-14C show exemplary screen transitions from the status monitor screen to a contact/consumable supplies information screen. In FIG. 14A, the status monitor screen includes tab tb13 for switching to the contact/consumable supplies information screen.

When the tab tb13 in the status monitor screen is pressed, screen di13-1 of the contact/consumable supplies information screen may be displayed as is shown in FIG. 14B. When a next page button in the screen di13-1 is pressed, screen di13-2 of the contact/consumable supplies information screen may be displayed as is shown in FIG. 14C.

Figure 14E:
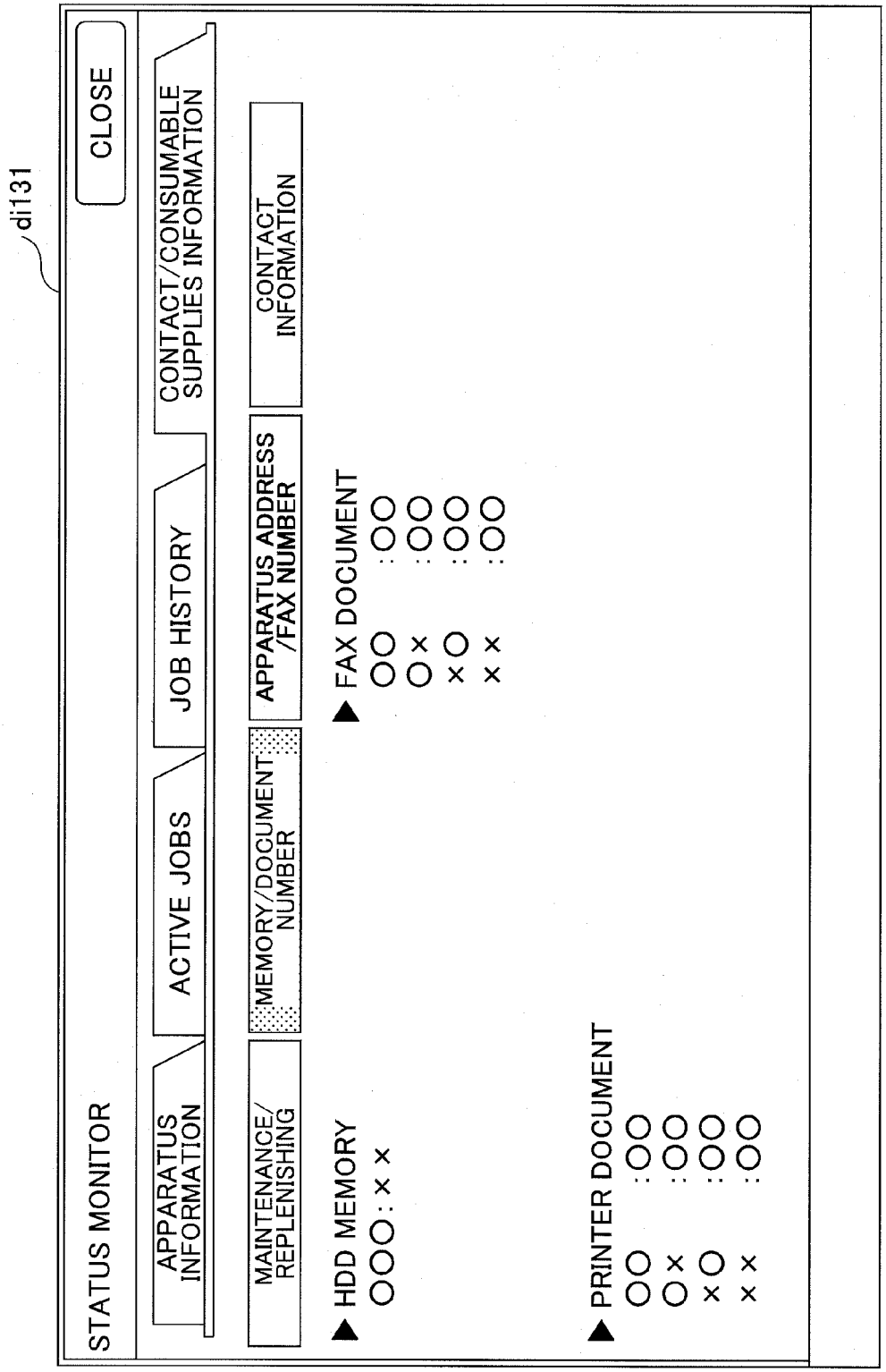
Figure 14F:
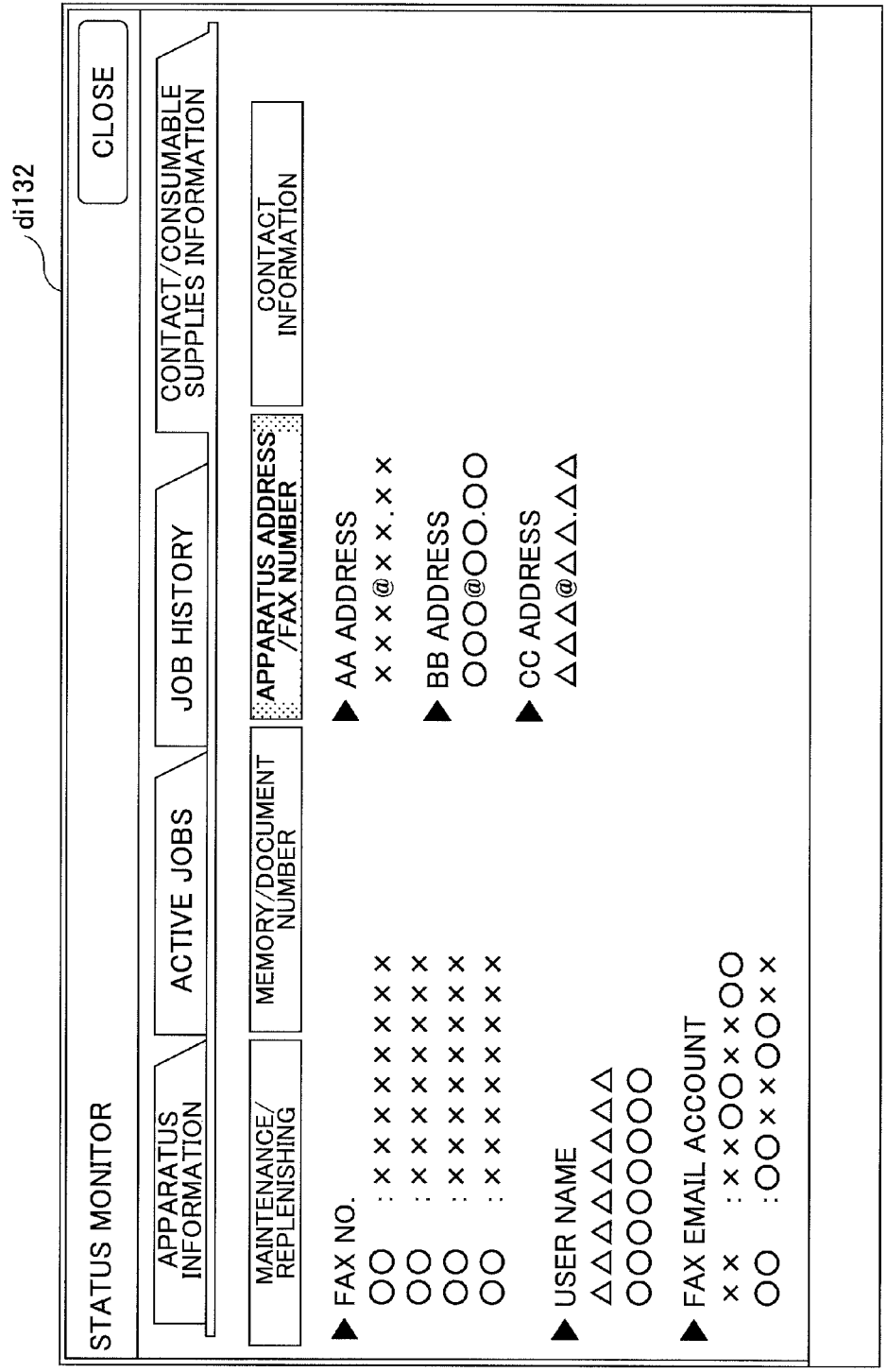

FIGS. 14D-14G show exemplary screen transitions from the contact/consumable supplies information screen to various other screens. As is shown in FIG. 14D, the contact/consumable supplies information screen includes a memory/document number button, an apparatus address/fax number button, and a contact information button. When the memory/document number button is pressed, the screen display may be switched to a memory/document number screen di131 as is shown in FIG. 14E. When the apparatus address/fax number button is pressed, the screen display may be switched to an apparatus address/fax number screen di132 as is shown in FIG. 14E. When the contact information button is pressed, the screen display may be switched to a contact information screen di133 as is shown in FIG. 14G.

According to an aspect of the present embodiment, by enabling a screen switch from the status monitor screen to other screens that provide information such as the consumable supplies information and contact information, a user may be spared the trouble of having to return to a home screen from the status monitor screen to check such information so that operability may be improved, for example.

<Response & Details>

It is noted that when an icon indicating an error status is displayed in the status monitor screen, a user may wish to check the details of the error or the appropriate manner of responding to the error, for example. Accordingly, the screen generating unit 74 may have the select buttons for the apparatus and application status displays of the status monitor screen associated with corresponding error screens.

Figure 15:
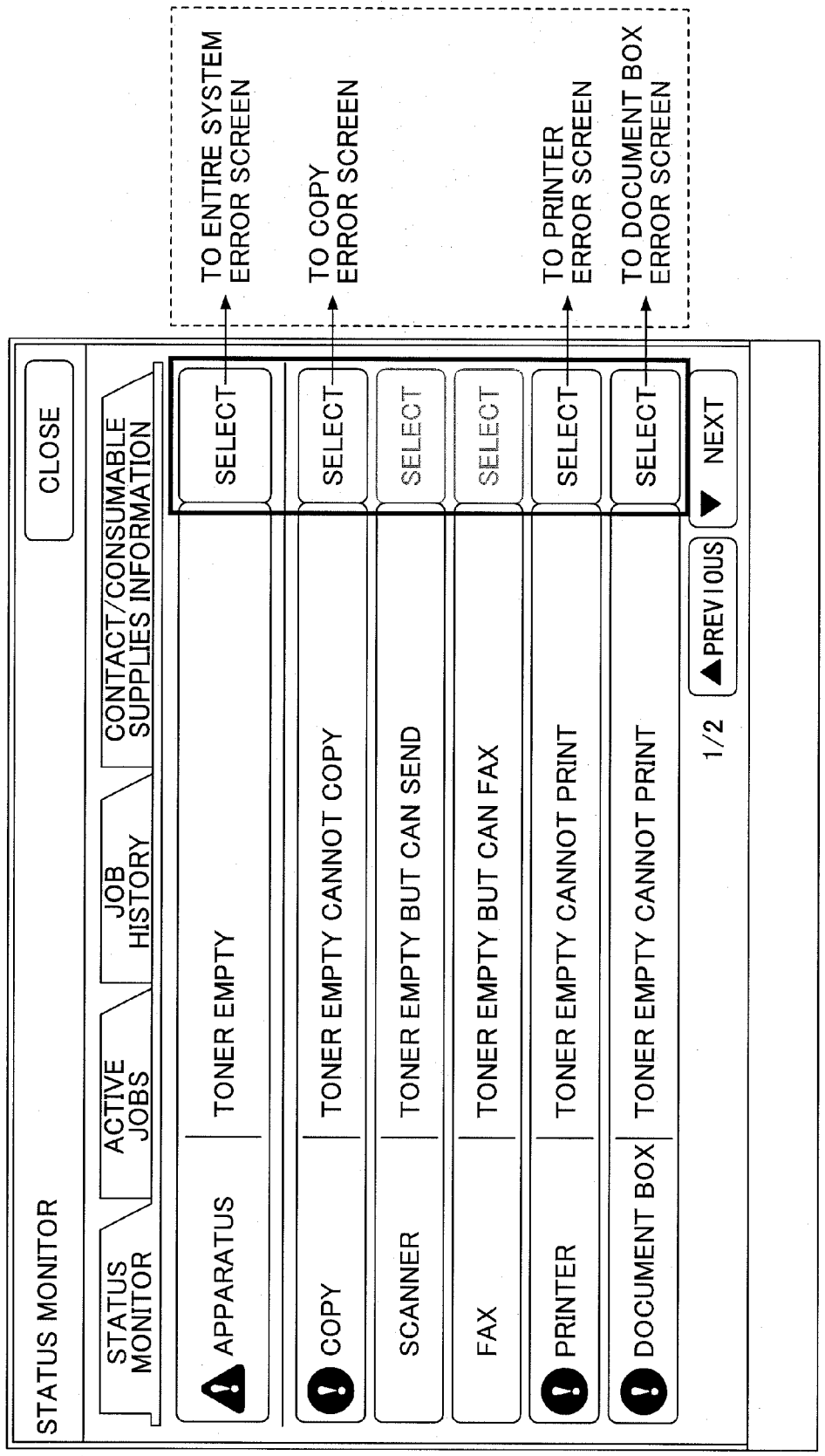
FIG. 15 is a diagram showing examples of error screens that may be displayed in response to the pressing of a select button displayed in the status monitor screen.

FIG. 15 shows examples of error screens that are associated with the select buttons of the status monitor screen. In FIG. 15, when the select button for the apparatus status is pressed, the screen control unit 72 may prompt a screen switch to an error screen of the entire system.

When the select button for the copy application status is pressed, the screen control unit 72 may send a request to the copy application 21 to display a copy error screen. The copy application 21 may have a screen indicating detailed information of the error and/or the manner of responding to the error generated beforehand. It is noted that an error screen refers to a screen indicating such detailed information of the error and/or the manner of responding to the error.

When a select button for the printer application status is pressed, the screen control unit 72 may send a request to the printer application 23 to display a printer error screen. The printer application 23 may have a screen indicating detailed information of the error and/or the manner of responding to the error generated beforehand.

When the select button for the document box application status is pressed, the screen control unit 72 may request the document box application (not shown) to display a document box error screen. The document box application may have a screen indicating detailed information of the error and/or the manner of responding to the error generated beforehand.

According to an aspect of the present embodiment, based on information on the statues of the apparatus hardware and applications indicated in the status monitor screen, a user may easily check detailed information of an error and/or the manner of responding to the error.

In one preferred embodiment, when more than one system error and/or application errors occur, information on the manner of responding to the error with a higher priority may be displayed first. This may be enabled by having the applications set priority levels for errors beforehand and displaying the manner of responding to the errors in order according to their priority levels.

<Additional Application>

In one preferred embodiment, when an additional application is newly installed in the image processing apparatus 10, the status managing unit 75 obtains status information of the additional application. The status managing unit 75 also obtains other relevant information such as the name of the additional application.

Upon generating the status monitor screen, the screen generating unit 74 includes a status display of the additional application. In this way, when an additional application is newly installed, the additional application may be automatically registered in the status monitor screen.

<Operations>

In the following, operations of the image processing apparatus 10 are described.

Figure 16:
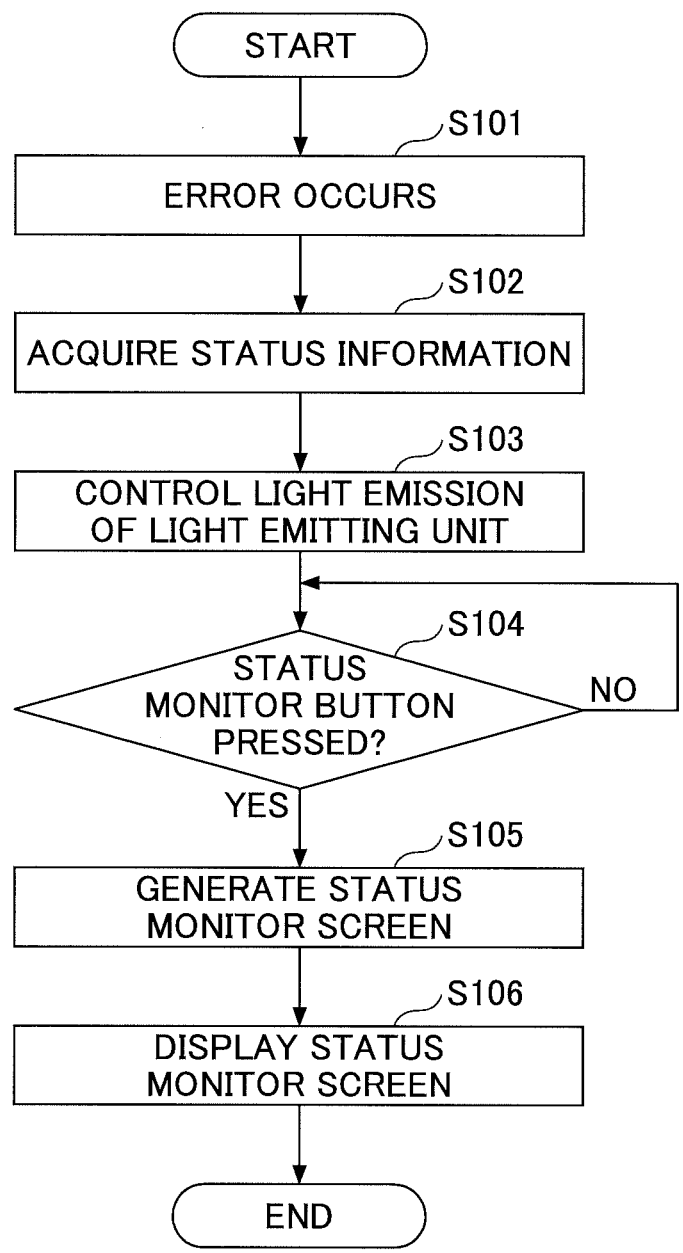
FIG. 16 is a flowchart showing exemplary process steps for displaying the status monitor screen.

FIG. 16 is a flowchart showing exemplary process steps of the image processing apparatus 10 for displaying a status monitor screen.

In step S101, the system managing unit 61 or the standard applications 20 detects the occurrence of an error. An error refers to some type of problem such as toner empty, cover open, communication error, or a paper jam, for example.

In step S102, the status managing unit 75 uses the acquiring unit 76 to acquire status information from the system managing unit 61 and the standard applications 20. The status information may include a status ID indicating the status of the apparatus hardware or application, for example.

In step S103, the status managing unit 75 refers to the acquired status information and the screen information storage unit 73 to control the light emission of the light emitting unit 91. The status managing unit 75 determines which icon is to be displayed in the status monitor screen and determines the light emission pattern of the light emitting unit 91 based on the icon to be displayed. The light emission pattern of the light emitting unit 91 may be determined in conjunction with the icon to be displayed in the status monitor screen according to the information shown in FIG. 12, for example.

In step S104, the input unit 71 determines whether the status monitor button 90 has been pressed by a user. If the status monitor button 90 has been pressed (YES in S104), the input unit 71 issues a status monitor screen display request and the process proceeds to step S105. If the status monitor button 90 is not pressed (NO in S104), the process returns to step S104.

In step S105, upon receiving the status monitor screen display request, the screen generating unit 74 generates the status monitor screen based on relevant information such as the status information, the screen configuration information, icon image information, and the status description information stored in the screen information storage unit 73.

In step S106, the display unit 70 displays the status monitor screen generated by the screen generating unit 74.

The screen control unit 72 controls operations for switching the status monitor screen to another screen such as an error screen indicating detailed information of an error and/or the manner of responding to the error, an active job list screen, or a job history list screen, for example.

According to an aspect of the present embodiment, the visibility of the apparatus status and the application status may be improved in the image processing apparatus.

[Modified Embodiments]

In one embodiment, a computer program executed by the image processing apparatus according to the first embodiment may be stored in a computer-readable medium such as a CD-ROM, a flexible disk, a CD-R, or a DVD, in a computer-executable and computer-installable file format.

In another embodiment, a computer program executed by the image processing apparatus according to the first embodiment may be stored in a computer that is connected to a network such as the Internet so that the computer program may be downloaded from the computer via the network.

In another embodiment, a computer program executed by the image processing apparatus according to the first embodiment may be pre-installed in a ROM, for example.

In one preferred embodiment, a computer program executed by the image processing apparatus 10 according to the first embodiment may be arranged into a modular configuration with modules for realizing the various functional units of the image processing apparatus 10 described above. In terms of hardware, one or more of these functional units may be realized by the CPU 111 reading one or more programs from the HDD 114 and loading the programs onto the RAM 112 to execute the programs, for example.

Further, the present invention is not limited to these embodiments, and numerous variations and modifications may be made without departing from the scope of the present invention.

The present application is based on and claims the benefit of the priority date of Japanese Patent Application No. 2011-244717 filed on Nov. 8, 2011, with the Japanese Patent Office, the entire contents of which are hereby incorporated by reference.

What is claimed is:

1. An image processing apparatus comprising:
a system managing unit configured to manage an apparatus status of apparatus hardware;
an acquiring unit configured to acquire application status information of an application from the application and apparatus status information from the system managing unit;
an input unit configured to accept a display request for displaying a status monitor screen indicating an overall system status;
a screen generating unit configured to receive the display request and generate the status monitor screen based on the application status information and the apparatus status information acquired by the acquiring unit, the status monitor screen including an application status display and an apparatus status display;
a display unit configured to display the status monitor screen generated by the screen generating unit; and
a storage unit configured to store status association information including a predetermined status icon and a predetermined status description for the application that is associated with a predetermined apparatus status,
wherein the screen generating unit arranges the apparatus status display to include an apparatus status icon and an apparatus status description corresponding to the apparatus status information acquired by the acquiring unit; and
the screen generating unit arranges the application status display to include an application status icon and an application status description corresponding to the application status information acquired by the acquiring unit;

wherein when the apparatus status acquired by the acquiring unit corresponds to the predetermined apparatus status included in the status association information, the screen generating unit arranges the application status display to include the predetermined status icon and the predetermined status description for the application that is associated with the predetermined apparatus status instead of the application status icon and the application status description corresponding to the application status information acquired from the application by the acquiring unit.

2. The image processing apparatus as claimed in claim 1, wherein the screen generating unit arranges the status monitor screen to include a user interface component for displaying at least one of a detailed description of an error and a manner of responding to the error in association with at least one of the apparatus status display and the application status display that indicates an error status.

3. The image processing apparatus as claimed in claim 1, further comprising:

a light emitting unit configured to emit or flash light and indicate the overall system status;

wherein the input unit includes a hard function key and the light emitting unit is arranged near the hard function key.

4. The image processing apparatus as claimed in claim 3, wherein the light emitting unit is configured to emit or flash light in conjunction with the application status display and the apparatus status display of the status monitor screen.

5. The image processing apparatus as claimed in claim 1, wherein the screen generating unit arranges the status monitor screen to include a user interface component for displaying an active job and a user interface component for displaying a job history.

6. The image processing apparatus as claimed in claim 1, wherein when an additional application is installed, the acquiring unit acquires additional application status information of the additional application; and the screen generating unit arranges the status monitor screen to include an additional application status display of the additional application.

7. An image processing method comprising:

acquiring application status information of an application from the application and apparatus status information of apparatus hardware from a system managing unit;

accepting a display request for displaying a status monitor screen indicating an overall system status via an input unit;

generating the status monitor screen in response to the display request based on the acquired application status information and the acquired apparatus status information, the status monitor screen including an application status display and an apparatus status display;

displaying the generated status monitor screen; and storing status association information including a predetermined status icon and a predetermined status description for the application that is associated with a predetermined apparatus status, wherein arranging the apparatus status display to include an apparatus status icon and an apparatus status description corresponding to the acquired apparatus status information; and arranging the application status display to include an application status icon and an application status description corresponding to the acquired application status information;

wherein when the acquired apparatus status corresponds to the predetermined apparatus status included in the status association information, the application status display is arranged to include the predetermined status icon and the predetermined status description for the application that is associated with the predetermined apparatus status instead of the application status icon and the application status description corresponding to the acquired application status information.

8. The image processing method as claimed in claim 7, further comprising:

arranging the status monitor screen to include a user interface component for displaying at least one of a detailed description of an error and a manner of responding to the error in association with at least one of the apparatus status display and the application status display that indicates an error status.

9. The image processing method as claimed in claim 7, further comprising:

controlling a light emitting unit to emit or flash light and indicate the overall system status;

wherein the input unit includes a hard function key and the light emitting unit is arranged near the hard function key.

10. The image processing method as claimed in claim 9, wherein the light emitting unit is controlled to emit or flash light in conjunction with the application status display and the apparatus status display of the status monitor screen.

11. The image processing method as claimed in claim 7, further comprising:

arranging the status monitor screen to include a user interface component for displaying an active job and a user interface component for displaying a job history.

12. The image processing method as claimed in claim 7, further comprising:

installing an additional application;

acquiring additional application status information of the additional application; and arranging the status monitor screen to include an additional application status display of the additional application.

13. A non-transitory computer-readable medium having a program stored thereon that is executable by a computer to cause the computer to execute an image processing method comprising:

acquiring application status information of an application from the application and apparatus status information of apparatus hardware from a system managing unit;

accepting a display request for displaying a status monitor screen indicating an overall system status via an input unit;

generating the status monitor screen in response to the display request based on the acquired application status information and the acquired apparatus status information, the status monitor screen including an application status display and an apparatus status display;

displaying the generated status monitor screen; and storing status association information including a predetermined status icon and a predetermined status description for the application that is associated with a predetermined apparatus status, wherein arranging the apparatus status display to include an apparatus status icon and an apparatus status description corresponding to the acquired apparatus status information; and arranging the application status display to include an application status icon and an application status description corresponding to the acquired application status information;

wherein when the acquired apparatus status corresponds to the predetermined apparatus status included in the status association information, the application status display is arranged to include the predetermined status icon and the predetermined status description for the application that is associated with the predetermined apparatus status instead of the application status icon and the application status description corresponding to the acquired application status information.

* * * * *